US006297764B1

(12) United States Patent
Wormington et al.

(10) Patent No.: US 6,297,764 B1
(45) Date of Patent: Oct. 2, 2001

(54) RADAR RECEIVER HAVING MATCHED FILTER PROCESSING

(75) Inventors: Terry Wormington, Satellite Beach; John S. Seybold, Orlando; James Rhoa, Palm Bay, all of FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/459,837

(22) Filed: Dec. 13, 1999

(51) Int. Cl.[7] ....................................................... G01S 13/58
(52) U.S. Cl. .............................. 342/101; 342/14; 342/27; 342/28; 342/89; 342/91; 342/93; 342/175; 342/98; 342/99; 342/104; 342/115; 342/165; 342/194; 342/195; 342/196
(58) Field of Search ......................... 342/27, 28, 89–105, 342/128–132, 134–144, 159, 165, 173–175, 189–197, 13–20, 115

(56) References Cited

U.S. PATENT DOCUMENTS

| | | | |
|---|---|---|---|
| 3,987,285 | * 10/1976 | Perry | 342/194 X |
| 4,266,279 | 5/1981 | Hines . | |
| 4,622,552 | * 11/1986 | Andrews et al. | 342/196 |
| 4,635,061 | 1/1987 | Lepere et al. | 342/195 |
| 5,151,702 | * 9/1992 | Urkowitz | 342/134 |
| 5,376,939 | * 12/1994 | Urkowitz | 342/134 |
| 5,440,311 | * 8/1995 | Gallagher et al. | 342/132 |
| 5,539,412 | 7/1996 | Mendelson | 342/192 |
| 5,557,560 | 9/1996 | Dix et al. . | |
| 5,784,026 | 7/1998 | Smith et al. | 342/160 |

* cited by examiner

Primary Examiner—Bernarr E. Gregory
(74) Attorney, Agent, or Firm—Allen, Dyer, Doppelt, Milbrath & Gilchrist, P.A.

(57) ABSTRACT

An electronic counter-measure receiver can be colocated with a threat simulator radar, which transmits a radar signal. As a pulsed-Doppler signal, this transmitted radar signal is sampled as a reference signal by the receiver to determine quadrature, coherent matched filter coefficients. A return signal is received and processed with the reference signal as quadrature signal components with the quadrature, coherent matched filter coefficients within a matched filter. The return signal is processed as a first intermediate frequency via a mixer and local oscillator and a second quadrature intermediate frequency via a digital local oscillator and mixer. A fast Fourier transform is performed to determine Doppler information. In a continuous wave transmission for sampling arbitrary but unevenly spaced in time pulses are generated from a pulse generator source internal to the receiver.

23 Claims, 27 Drawing Sheets

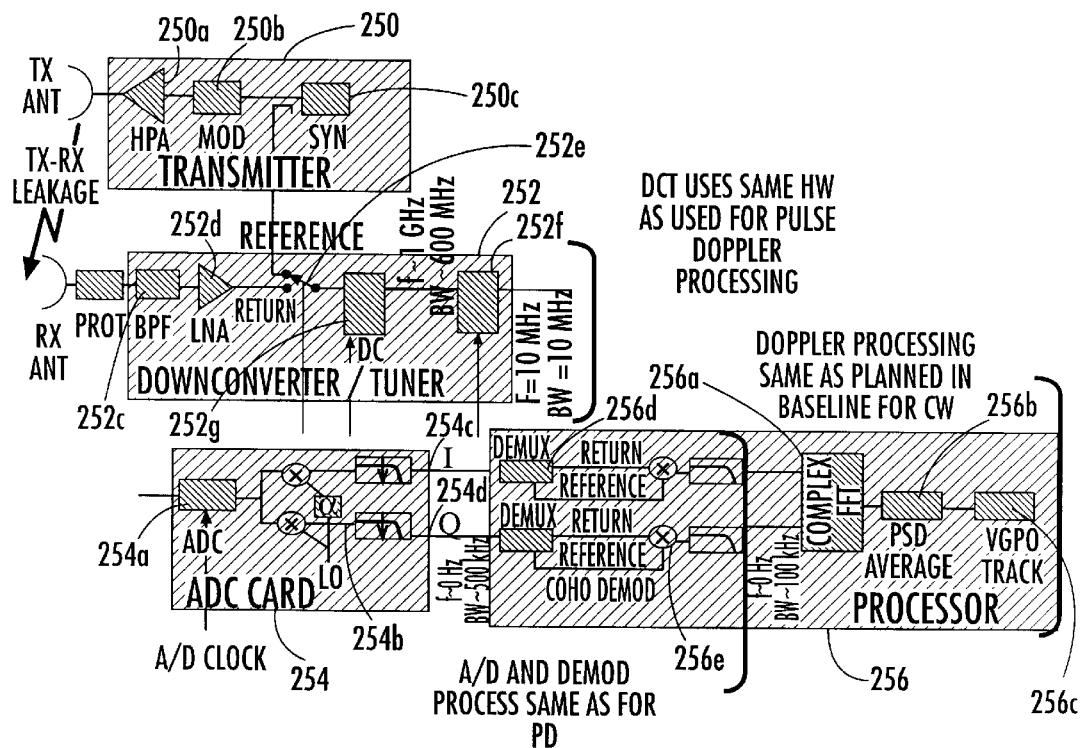
FIG. 12.
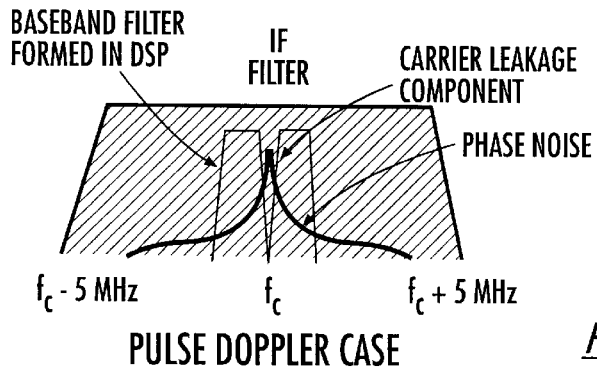
PULSE DOPPLER CASE      FIG. 8a.
SPECTRUM OF INTEREST      FIG. 8b.

RGPO PULL-OFF IS QUADRATIC WITH TIME $$\text{PULL-OFF}(t) = \alpha + \beta t^2$$

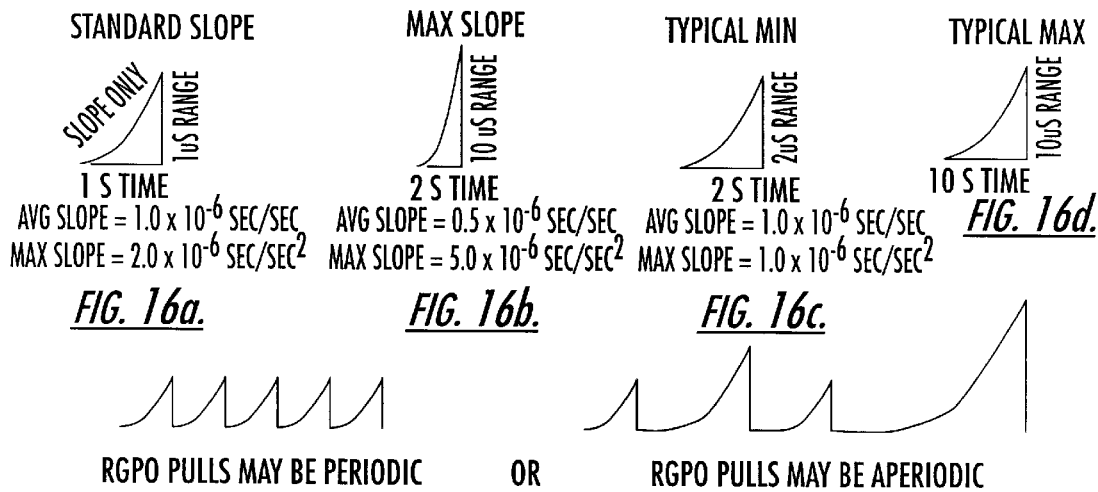

FIG. 16a. STANDARD SLOPE — SLOPE ONLY, 1uS RANGE, 1 S TIME, AVG SLOPE = $1.0 \times 10^{-6}$ SEC/SEC, MAX SLOPE = $2.0 \times 10^{-6}$ SEC/SEC$^2$ FIG. 16b. MAX SLOPE — 10 uS RANGE, 2 S TIME, AVG SLOPE = $0.5 \times 10^{-6}$ SEC/SEC, MAX SLOPE = $5.0 \times 10^{-6}$ SEC/SEC$^2$ FIG. 16c. TYPICAL MIN — 2uS RANGE, 2 S TIME, AVG SLOPE = $1.0 \times 10^{-6}$ SEC/SEC, MAX SLOPE = $1.0 \times 10^{-6}$ SEC/SEC$^2$ FIG. 16d. TYPICAL MAX — 10uS RANGE, 10 S TIME FIG. 16e. RGPO PULLS MAY BE PERIODIC

OR

FIG. 16f. RGPO PULLS MAY BE APERIODIC

VGPO PULL-OFF IS LINEAR WITH TIME $$\text{PULL-OFF}(t) = \alpha + \beta t$$

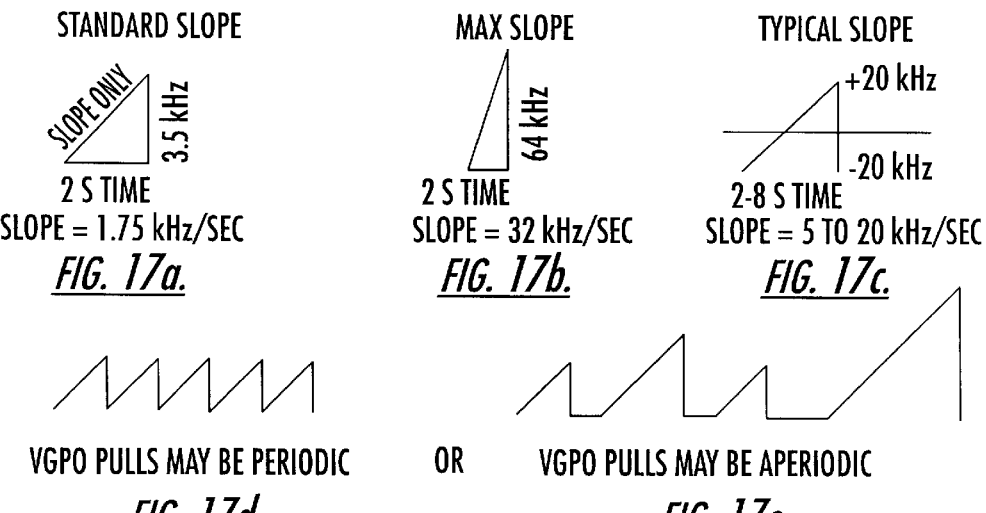

FIG. 17a. STANDARD SLOPE — SLOPE ONLY, 3.5 kHz, 2 S TIME, SLOPE = 1.75 kHz/SEC

FIG. 17b. MAX SLOPE — 64 kHz, 2 S TIME, SLOPE = 32 kHz/SEC

FIG. 17c. TYPICAL SLOPE — +20 kHz, −20 kHz, 2-8 S TIME, SLOPE = 5 TO 20 kHz/SEC

FIG. 17d. VGPO PULLS MAY BE PERIODIC

OR

FIG. 17e. VGPO PULLS MAY BE APERIODIC

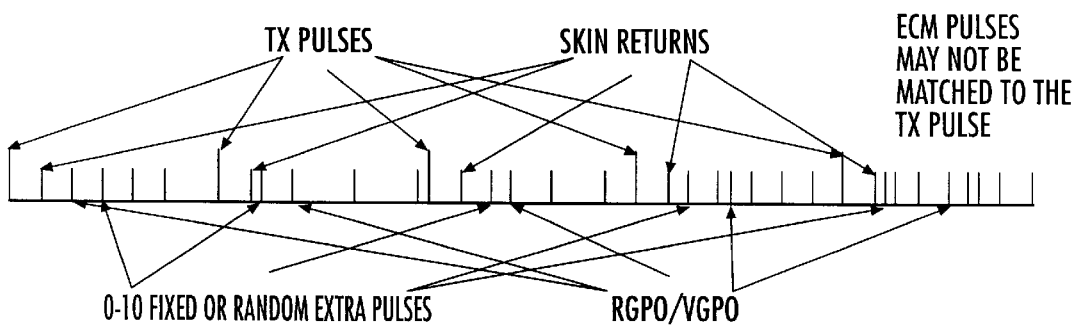
FIG. 18a.
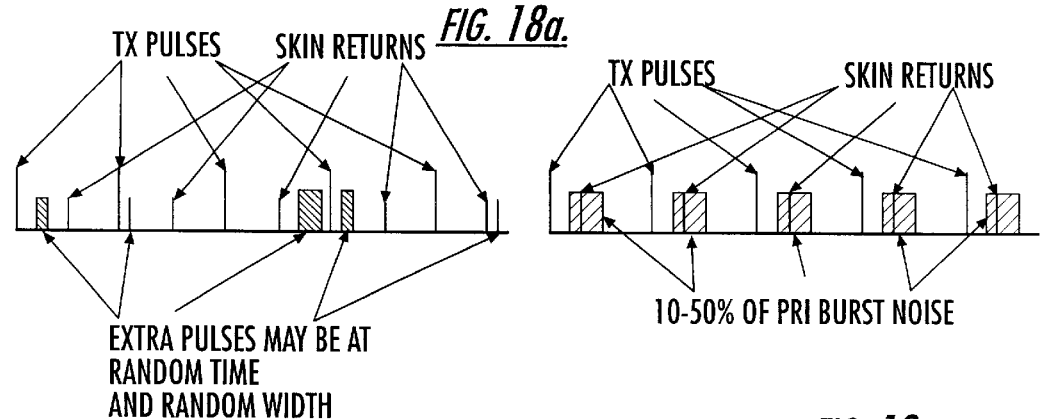
FIG. 18b.
FIG. 18c.

FIG. 19a.
FIG. 19b.
FIG. 19c.
RANGE DOPPLER MAP
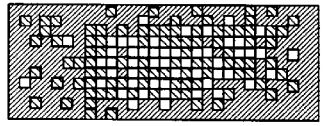
ANALOG MAP AT ADVANCED ECM RECEIVER
FIG. 20a.
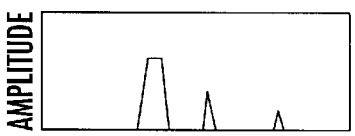
RANGE
RANGE PROJECTION AT MCG
FIG. 20b.
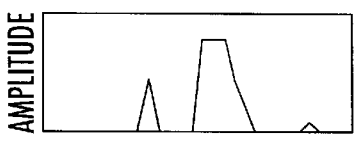
DOPPLER
VELOCITY PROJECTION AT MCG
FIG. 20c.
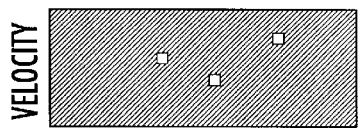
RANGE
COMPRESSED MAP AT MCG
FIG. 20d.

AT UNAMBIGUOUS RANGES, THE TARGET RETURNS OCCUR PRIOR TO THE NEXT TRANSMITTED PULSE

TARGET RETURNS

AT AMBIGUOUS RANGES, THE TARGET RETURNS OCCUR FOLLOWING ONE OR MORE SUBSEQUENT TRANSMITTED PULSE

NO BEFORE NEXT
PULSE TRANSMISSION  TARGET RETURNS
PULSE REPETITION INTERVAL

RADAR RECEIVER HAVING MATCHED FILTER PROCESSING

FIELD OF THE INVENTION

This invention relates to the field of radar, and more particularly, this invention relates to the field of processing radar signals to determine Doppler information.

BACKGROUND OF THE INVENTION

Electronic counter-measure receivers for training systems may be collocated with a radar transmitter. For pulse-Doppler and CW radar modes, the received signal is usually detected using a matched filter to maximize the probability of detection and processed through fast Fourier transform circuitry to provide Doppler information. The ideal matched filter is a time reversed copy of a transmitted pulse. The CW typically requires a separate and narrower channel and the ideal matched filter is a large fast Fourier transform circuitry with a long data record. Typically, the different modes, such as pulse-Doppler, pulse and CW, required different receiver designs of varying complexity. Thus, an additional cost was added when different modes were processed.

SUMMARY OF THE INVENTION

It is therefore an object of the present invention to provide a radar receiver that can be colocated with a threat simulator radar, permit characterization of an aircraft's response, and use pulse-Doppler, pulse and CW modes.

The radar receiver of the present invention is an ECM receiver that can be colocated with a threat simulator radar, which will illuminate the target aircraft. The receiver permits characterization of the aircraft's response to a simulated threat radar signal.

The ECM receiver is provided with target location information from an IFF tracking system to keep it on target even under heavy counter-measures. The receiver is capable of processing CW, pulse and pulse-Doppler radar signals and their associated counter-measures. In particular, the counter-measures of interest are range gate pull-off (RGPO), velocity gate pull-off (VGPO), noise ECM and amplitude modulation of the pose ECM.

The radar receiver uses a sampled transmit signal to form a matched filter for signal detection. This provides several unique advantages, including nearly optimal detection, guaranteed coherence, and allows the use of better leakage and clutter rejection filters.

The pulse-Doppler radar receiver is blanked during transmit to protect the receiver front-end. The receiver uses that window of time to sample the transmit pulse for use as a reference for detection. The blanking is controlled by a blanking pulse that rises just prior to the start of transmit and falls shortly after the transmit pulse ends. This blanking pulse is made available to the ECM receiver and is used to switch both the front end and the signal processing chain between sampling the transmit signal and listening for the actual received signal.

The sampling is accomplished via an RF switch, and in one aspect of the present invention, an attenuator protects the receiver. The sampled signal is routed through the same signal path that the received signal will follow. The sampled RF transmit signal is first mixed to a 70 MHz IF and then digitized by an analog-to-digital converter (ADC). The sample rate is chosen to be 60 MHz so that the 70 MHz IF is aliased down to 10 MHz (with the higher frequency products removed by DDC filters). The signal is then digitally mixed with a local oscillator (LO) in quadrature to shift the signal to baseband. The local oscillator can be 10 MHz. The actual signal may be slightly shifted from baseband if any of the aforementioned frequencies are not exact. At this point, the data is conjugated, reversed in time, and then stored as the complex coefficients of the receivers matched FIR filter.

When the blanking pulse ends, the RF front-end is switched back to the antenna to listen for the signal. The switching of the DDC output is delayed to account for the signal path processing delay up to that point. Once the end of the blanking pulse passes through the delay, the output of the DDC is switched to the receive path and all of the DDC registers and buffers are cleared of any extraneous data.

The received data then follows the same signal path and upon exiting the DDC is routed into the FIR filter that is comprised of the processed transmit data samples. Since both the received data and the filter coefficients are processed through the same signal path, any residual frequency offset (from DC) will cancel, leaving the final signal that is truly baseband.

For application to the CW mode, the same processing chain is used. The primary difference is that an internal timing generator is used because there is no blanking pulse available since the transmitter is always transmitting. The other change is that the resulting range Doppler map is actually just a range-time map, which can be detected and integrated over time with no loss of information.

BRIEF DESCRIPTION OF THE DRAWINGS

Other objects, features and advantages of the present invention will become apparent from the detailed description of the invention which follows, when considered in light of the accompanying drawings in which:

FIGS. 8A and 8B are graphs showing the pulse-Doppler pulse and spectrum of interest with the carrier leakage component, phase noise, and IF filter, in accordance with the present invention.

FIG. 12 is yet another schematic, block diagram of the radar receiver of the present invention showing the down converter/tuner, ADC card and processor.

FIGS. 16A–F are graphs showing how the RGPO pull-off is quadratic with time.

FIGS. 17A–E are graphs showing how the VGPO pull-off is linear with time.

FIGS. 18A–C are graphs showing the timing different skin returns and transmit pulses.

FIGS. 19A–C are graphs illustrating velocity deception.

FIGS. 20A–D are graphs illustrating a range Doppler map that could be produced by means of the present invention.

DETAILED DESCRIPTION OF THE PREFERRED EMBODIMENTS

The radar system of the present invention is advantageous because it now allows hardware and software commonality and versatility to accommodate a variety of waveforms and modulations rapidly and cost effectively in an electronics counter measure (ECM) radar receiver colocated with a radar transmitter that uses pulse-Doppler and CW formats. The transmitted signal is sampled and digitized after mixing to an intermediate frequency (IF). The samples are then used to form a matched filter, and more particularly, a Finite Impulse Response (FIR) filter. The sampling occurs during transmission while the radar receiver would otherwise be blanked.

The radar receiver of the present invention can be used in continuous wave (CW) mode by switching between the reference and the received signal, as will be explained in greater detail below. In both a pulse-Doppler and CW mode, the advantages of the radar receiver are an improved detection performance and reduced hardware requirements resulting in a reduced overall cost. There is a hardware and software commonality between the two different modes. Because the matched filter coefficients are obtained at a second intermediate frequency (IF), the matched filter output is at baseband and requires no further mixing. This allows the implementation of better clutter cancellation filters at the digital baseband.

For either a pulse-Doppler or CW mode, the received signal and the reference signal follow the same signal path prior to digitizing. Thus, there are no hardware matching issues, which ensures coherence. The matched filter output is at base band and has no hardware induced frequency drift. The quadrature LO mixing allows measuring of both positive and negative Doppler.

By the use of the radar system with its receiver and method of the present invention, a conventional homodyne receiver is not necessary for continuous wave, and the radar system permits a clutter cancellation filter to be implemented digitally, allowing greater flexibility as compared to using an analog filter. The system of the present invention also permits a wideband front-end to be used, which facilitates other measurements, such as counter-measure signals directed against the receiver.

For CW signals, the method of the present invention incorporates a pulse-like timing signal in the receiver to alternate between sampling the reference and the received signal and is one novel aspect of the present invention. The radar system of the present invention also lends itself well to system updates and revisions, including new waveforms and pulse shapes with increasing levels of complexity.

Figure 1:
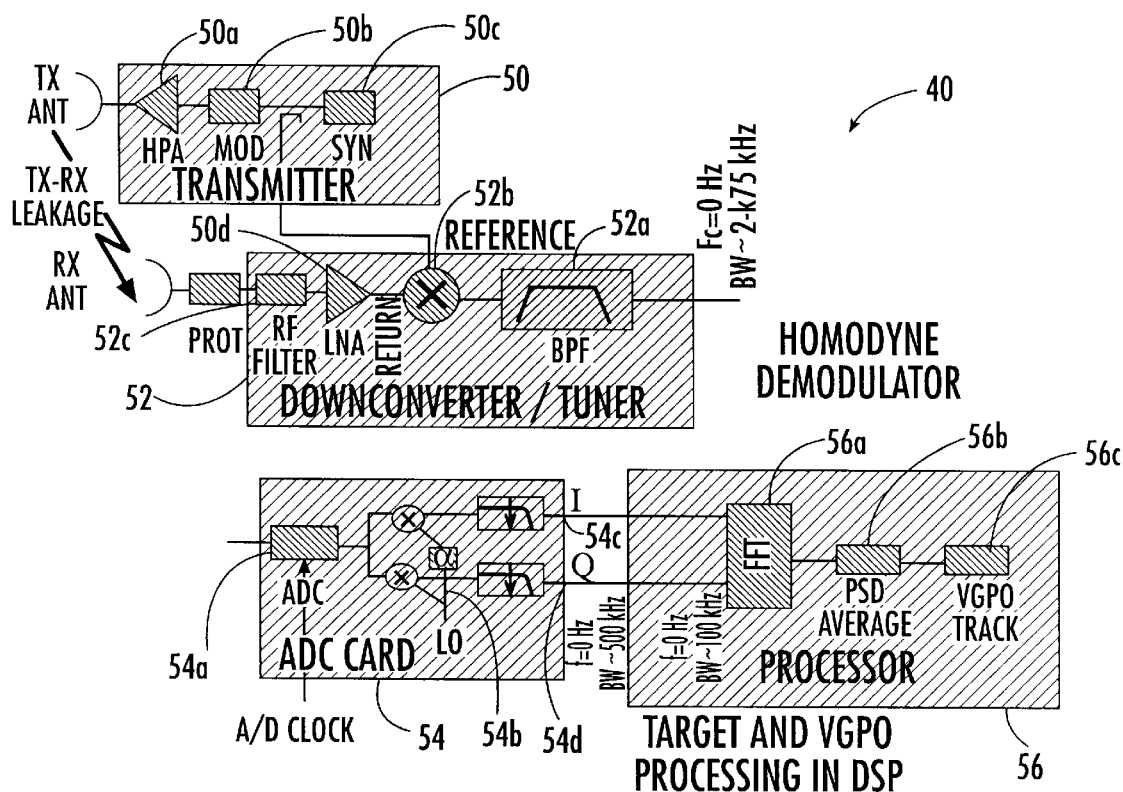
FIG. 1 is a high level block diagram of a prior art homodyne demodulator and receiver.

A prior art homodyne radar receiver 40 block diagram is shown in FIG. 1, and includes the general circuit components of a transmitter 50, down converter/tuner (DCT) 52, an analog-to-digital (ADC) card 54 and a processor 56. The homodyne radar receiver 40 and transmitter 50 includes a HPA amplifier 50a, modulator 50b and synthesizer 50c, as known to those skilled in the art. The DCT 52 includes the bandpass filter 52a, mixer 52b, filters 50c and amplifiers 50d, as known to those skilled in the art. The ADC card 54 includes the basic components of the ADC circuit 54a, two mixers (I,Q) and an oscillator 54b, and the respective I,Q outputs 54c, 54d. The processor 56 includes Fast Fourier Transform (FFT) circuitry 56a, a PSD averaging circuit 56b, and a velocity gate pull-off (VGPO) track circuit 56c.

Figure 2:
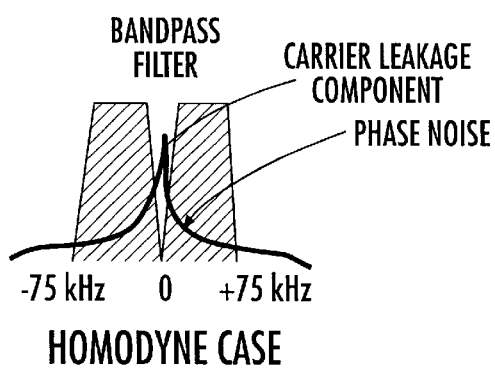
FIG. 2 is a graph showing a carrier signal used in the homodyne prior art receiver of FIG. 1, and showing the bandpass filter and phase noise end carrier leakage component.
Figure 3:
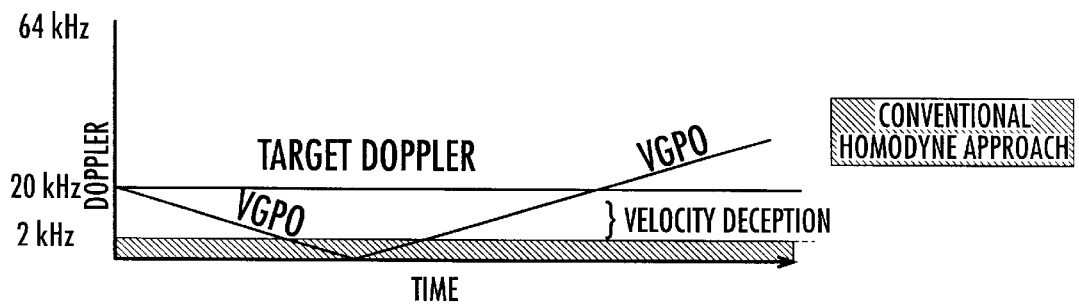
FIG. 3 is a graph showing the target Doppler and velocity deception for the prior art conventional, homodyne receiver.

The homodyne radar receiver 40 of the prior art avoided the need to digitize the zero Doppler component and the zero powers due to any transmitter leakage beating with the reference signal by using a fairly broad DC notch filter. A zero Doppler power, in most cases, would be larger than that of the target or electronic counter measure (ECM) by many decibels (dB). In the previous homodyne approach as shown in FIG. 2, the VGPO tracking logic was difficult. The DC notch hides targets and any ECM with Doppler components near zero. Any DSP generated DC notch size was typically larger than the filter resolution and the negative, moving VGPO disappeared in the DC notch and subsequently reappeared out of the notch as a positive moving VGPO, as shown in the target Doppler drawing of FIG. 3. The homodyne receiver, however, did have some advantages, including coherent demodulation with simple hardware and fewer parts. This required a dedicated homodyne down-converter channel. The DC notch was typically greater than 1 kHz and caused drop-out in the VGPO tracking. The negative Doppler frequency folding also complicated VGPO tracking.

Figure 5:
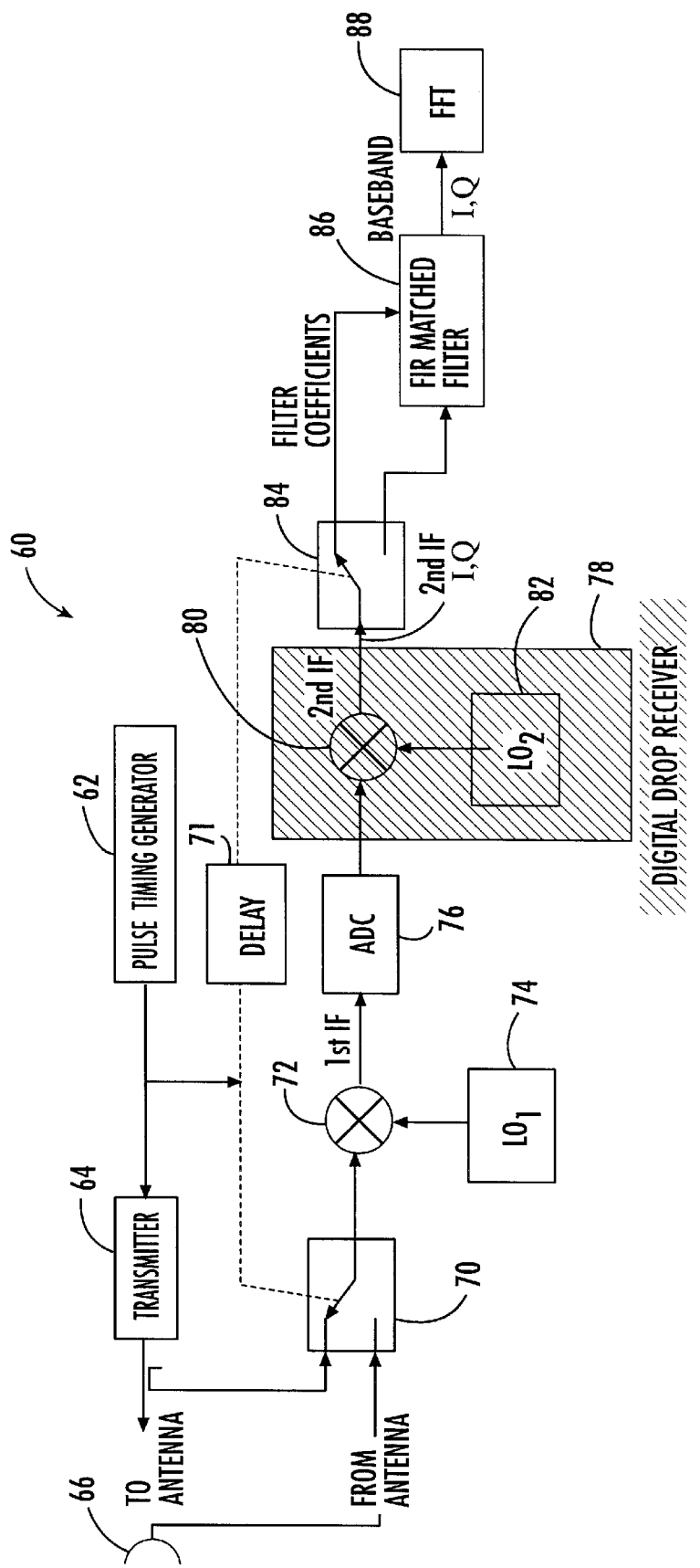
FIG. 5 is a high level schematic, block diagram of the radar receiver of the present invention colocated with a transmitter.

Referring now to FIG. 5, there is illustrated a high level block diagram of a radar apparatus 60 of the present invention, which uses a sampled transmitter signal to form a receiver matched filter. A pulse timing generator 62 generates rectangular pulses to the transmitter 64, which transmits the signals via the antenna 66. This transmitted signal becomes the reference signal and becomes coefficients of a matched filter. These coefficients can be stored. An antenna switch 70 allows switching between the sampling and the reference receiving the target return with a delay circuit 71. A first mixer 72 mixes the received signal with a first local oscillator 74 generated signal to produce a first intermediate frequency (IF) signal, which is forwarded to an analog-to-digital converter (ADC) 76.

This digital signal is forwarded to the digital drop receiver 78 (e.g., digital converter/tuner) where the signal is mixed or multiplied in a mixer 80 with a second local oscillator 82 signal to produce quadrature I,Q output at a second intermediate frequency. This I,Q signal can be switched via switch 84 for the reference signal that forms filter coefficients, and switched for the target return into a finite impulse response (FIR) matched filter 86 for baseband I,Q signals, which are then forwarded to the Fast Fourier Transform (FFT) processor 88. This description concerns a pulsed-Doppler application. However, the pulse timing generator could be replaced by a pseudo-pulse logic circuit for the CW mode, as explained in greater detail below.

Figure 6:
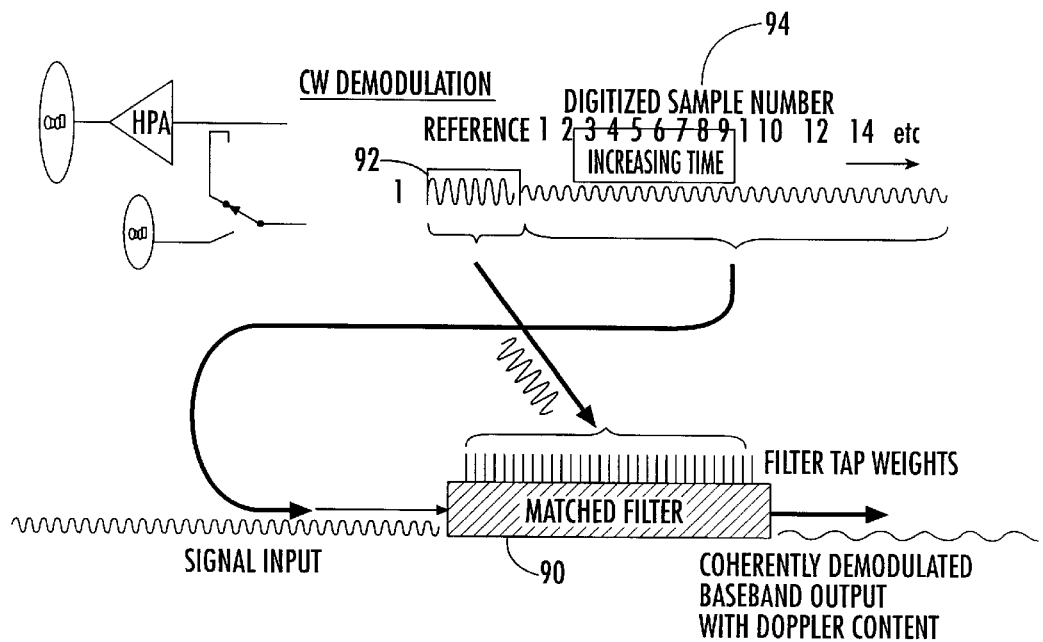
FIG. 6 is a schematic diagram of the CW demodulation process used in the present invention.

FIG. 6 illustrates the radar receiver of the resent invention where CW demodulation occurs. A matched filter 90 has received filter tap weights, which have been generated from the reference 92. A digitized reference 92 merges with the input, allow the coherently demodulated baseband output with Doppler content, which is then further processed.

Figure 4:
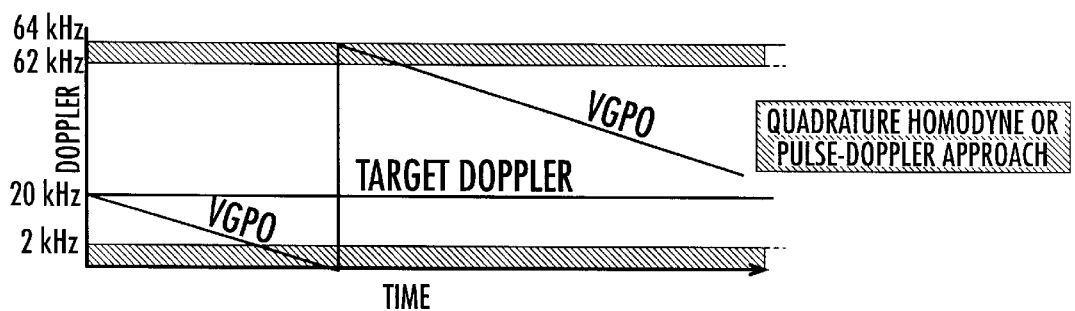
FIG. 4 is a graph showing target Doppler and VCPO with a pulse-Doppler radar apparatus of the present invention.

FIG. 4 illustrates how the radar system of the present invention, using the pulse-Doppler approach of the present invention, has easier VGPO tracking because the frequencies are not folded and the DC notch may be made narrower, simplifying the VGPO tracking logic.

Figure 7:
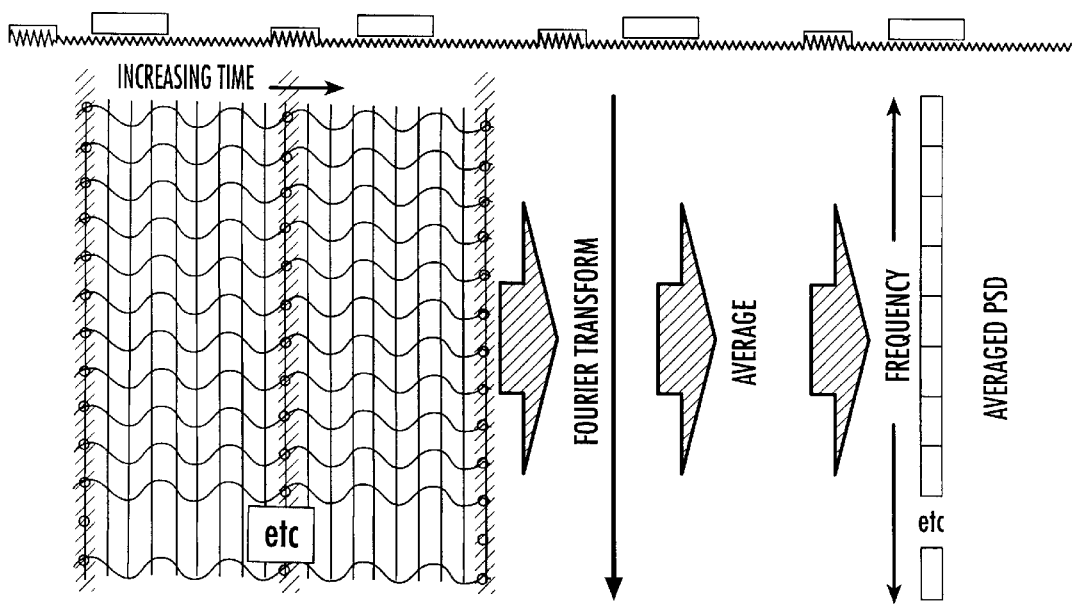
FIG. 7 is a schematic diagram showing the CW demodulation and Fourier transform into the average PSD.

FIGS. 8A and 8B also aid in understanding the advantages of the present invention, where in the pulse-Doppler processing mode, a narrow DC notch results in shorter VGPO tracking outage. FIG. 7 further illustrates CW demodulation where the average PSD is obtained via the Fourier transform.

Figure 9:
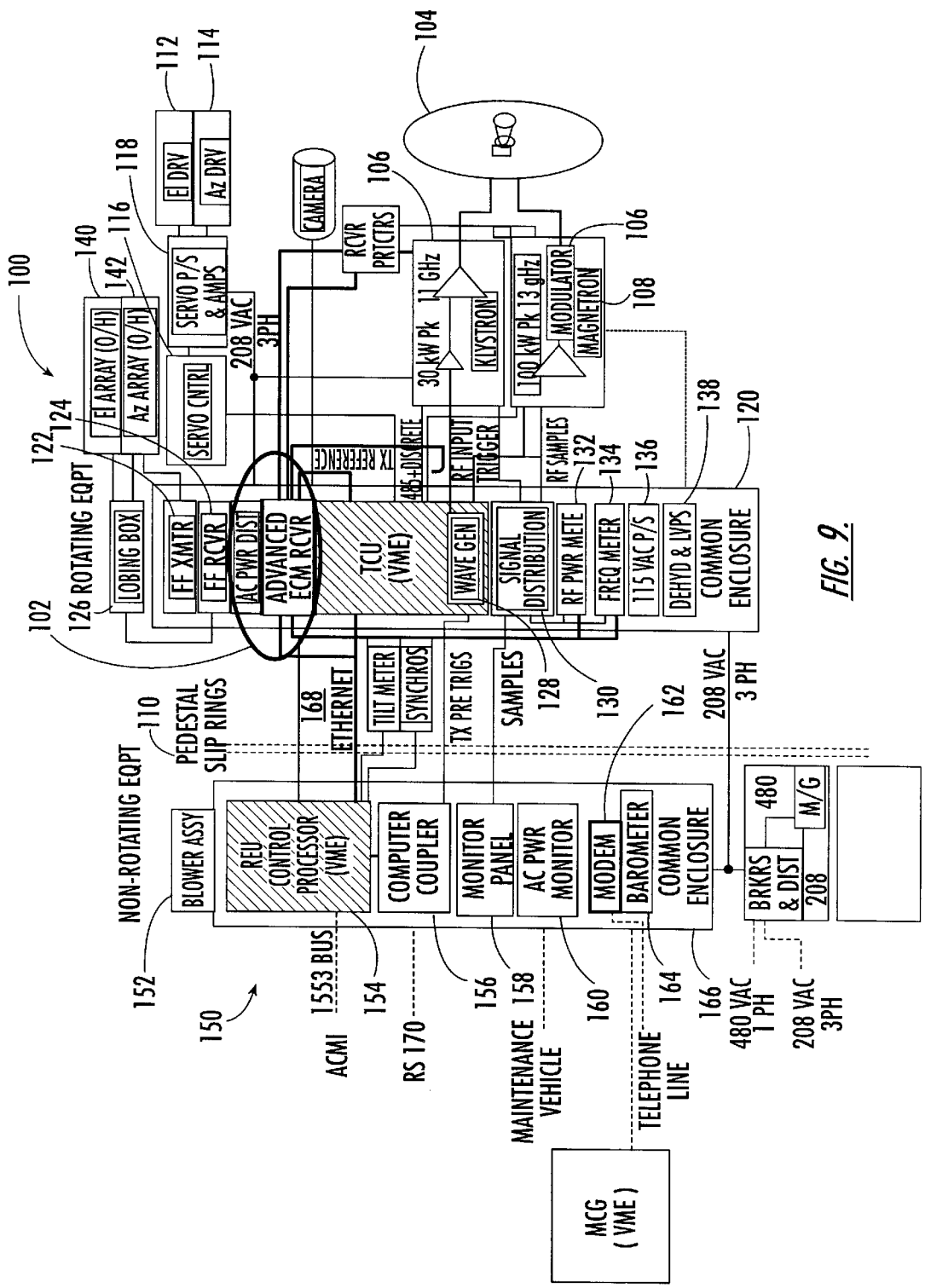
FIG. 9 is a high level schematic, block diagram of a radar system that can incorporate the radar receiver of the present invention.

Referring now to FIG. 9, there is illustrated generally at 100 a large radar system, as an example, which could incorporate the advanced electronic counter measure (ECM) receiver 102 of the present invention, which is indicated in the radar system by the circled area. Although the description of this radar system is only one type of example, the drawing shows a technical application that could be used. The radar system 100 includes the standard antenna 104, klystron assembly 106, modulator 108 and magnetron 110 connected to the antenna. The antenna 104 and associated circuits are part of the rotating equipment that is mounted on pedestal slip rings 110, as indicated by the dashed lines. A respective elevator and azimuth drive assembly 112, 114 connect to respective servocontroller 116 and servoamps 118, which connect to a common enclosure 120 that is part of a VME, as is known to those skilled in the art. The common enclosure includes the IFF transmitter and receiver 122, 124 connected also to Lobing Box 126, wave generator 128, signal distribution circuit 130, radio frequency power meter 132, frequency meter 134, power supply 136, such as a 115 volt AC, and LVPS 138, as is known to those skilled in the art. Elevation array 140 and azimuth array 142 are connected to the Lobing Box 126, which connects to the components contained in the common enclosure.

Non-rotating equipment, illustrated generally at 150, may include a blower assembly 152 and a control processor 154 as part of a VME, a computer coupler 156, a monitor panel 158, AC power monitor 160, modem 162, and barometer 164, all contained within a common enclosure 166. An Ethernet connection 168 would connect the rotating equipment components 150 to the non-rotating equipment components.

The receiver 102 of the present invention has various functional requirements, including a detect/report function that includes target and range deception with false targets, chaff, and RGPO circuitry and velocity deception, which includes the same false targets, chaff and VGPO circuitry. The RGPO and VGPO can use a simple range/Doppler tracker that follows detected electronic counter measures moving away from the target position and Doppler. ECM parametric reports can be provided which include a target return, such as amplitude, range and/or Doppler. The range deception could include amplitude and range and the velocity deception could include amplitude and Doppler. Multiple false targets can be analyzed, similar to the range and/or velocity deception, for up to ten detections. The noise electronic counter measures can also be determined with six dB bandwidths having upper and lower frequencies.

The receiver 102 of the present invention can also provide range and velocity deception measurements per time period, such as in seconds, which permits the tracking of RGPO/VGPO. It can provide one noise characterization per second and provide five A-scope measurements per second (5 FPS) centered at a target range of ±10 km. The receiver 102 of the present invention can also provide detection maps with range-Doppler maps, range map, or FFT bins with thresholded and substantially compressed detection maps.

The construction of the receiver 102 can be VME based with different cards used in slots. Commercial off-the-shelf (COTS) components can be used for signal processing, such as analog-to-digital and digital signal processing (DSP) equipment. A controller can support DSP and reporting.

Figure 10:
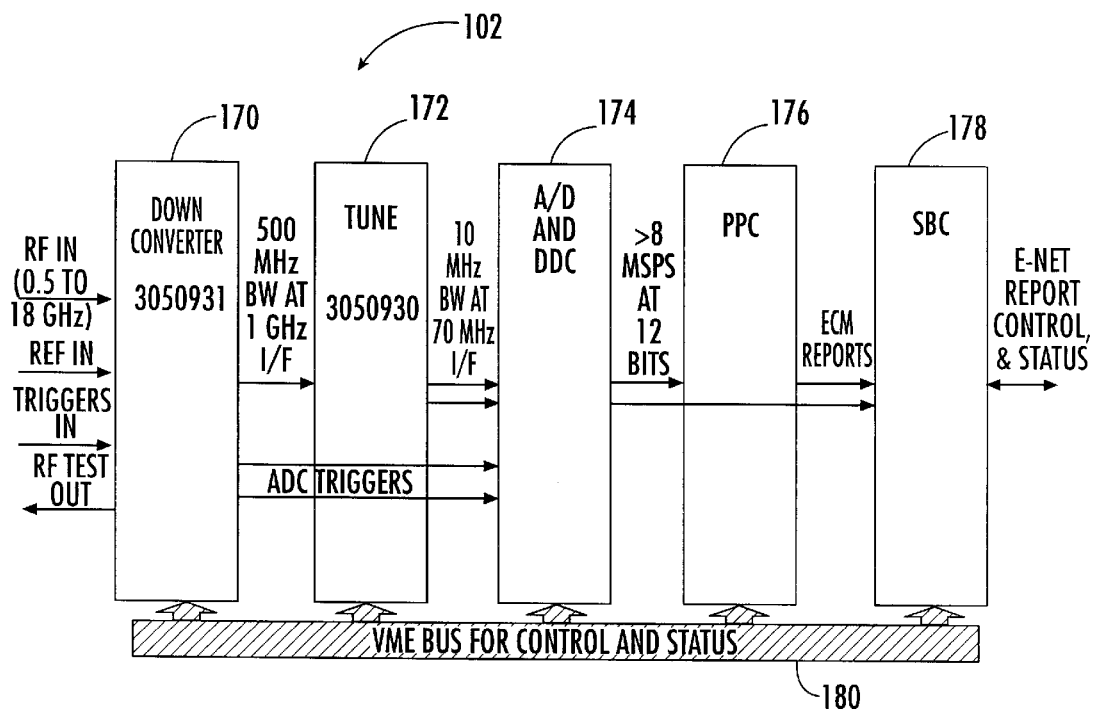
FIG. 10 is a high level block diagram showing basic components of the radar receiver of the present invention.

FIG. 10 illustrates a basic block diagram of the ECM receiver 102 of the present invention, and shows a down converter circuit 170, tuner 172, A/D and DDC circuits 174, a PPC circuit 176, and SBC circuit 178, connected into the VME bus 180, for control and status. The various operating ranges and reports as generated are shown in the figure.

The receiver 102 of the present invention acts as a specialized receiver that does not "acquire" and "track" targets as a traditional radar receiver. It detects target returns and detects target generated ECM, while also detecting ECM modes. The circuitry then measures radar signal characteristics. The receiver can be VME based, as noted before, and have analog RF down conversion and tuning, as an example, to 70 MHZ IF. It can use digital signal processing (DSP) for all detection and characterization. The receiver of the present invention works well with pulse radars, pulse-Doppler radars, and CW radars/illuminators.

The receiver can have up to four channels and RF filters and provide RF distribution and switching. It can be pedestal unique because of RF input filters and local oscillators that match transmitter radio frequency. Channel selection can be under MCG control and 1–4 channels can be tasked.

Figure 11:
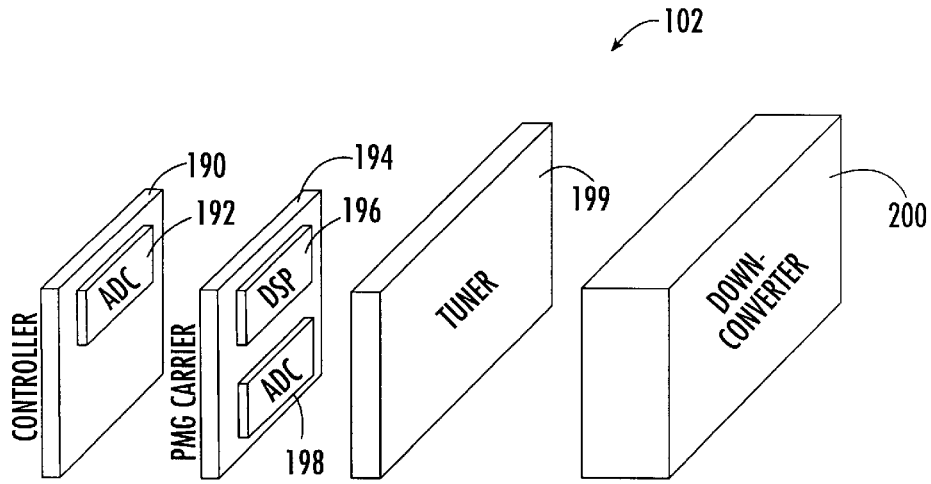
FIG. 11 is a schematic, block diagram showing basic structural components of the radar receiver of the present invention.

The physical layout of the four main component sections of the ECM receiver 102 of the present invention is shown in FIG. 11. The four main component sections include a controller 190 with the ADC 192. A PMG carrier section 194 has a digital signal processor 196 and analog/digital converter 198. A tuner 199 and down converter 200 form the two other component sections.

FIG. 12 illustrates the receiver 102 of the present invention having the transmitter 250, down converter 252, ADC card 254 and processor 256. Similar components for the pulsed-Doppler system shown in FIG. 12 that correspond to similar components shown in FIG. 1 are given similar reference numerals except in the 200 series. The processor 256, however, includes a complex FFT circuit 256a for quadrature I,Q signal processing, and respective I,Q demultiplexers 256d, as part of the mixers 256e associated with the COHo demodulator, such as known to those skilled in the art. The down converter/tuner 252 shows the additional circuitry of the return switch 252e for the sampling function, together with the bandwidth filter 252f, and down converter circuitry 252g.

Figure 13:
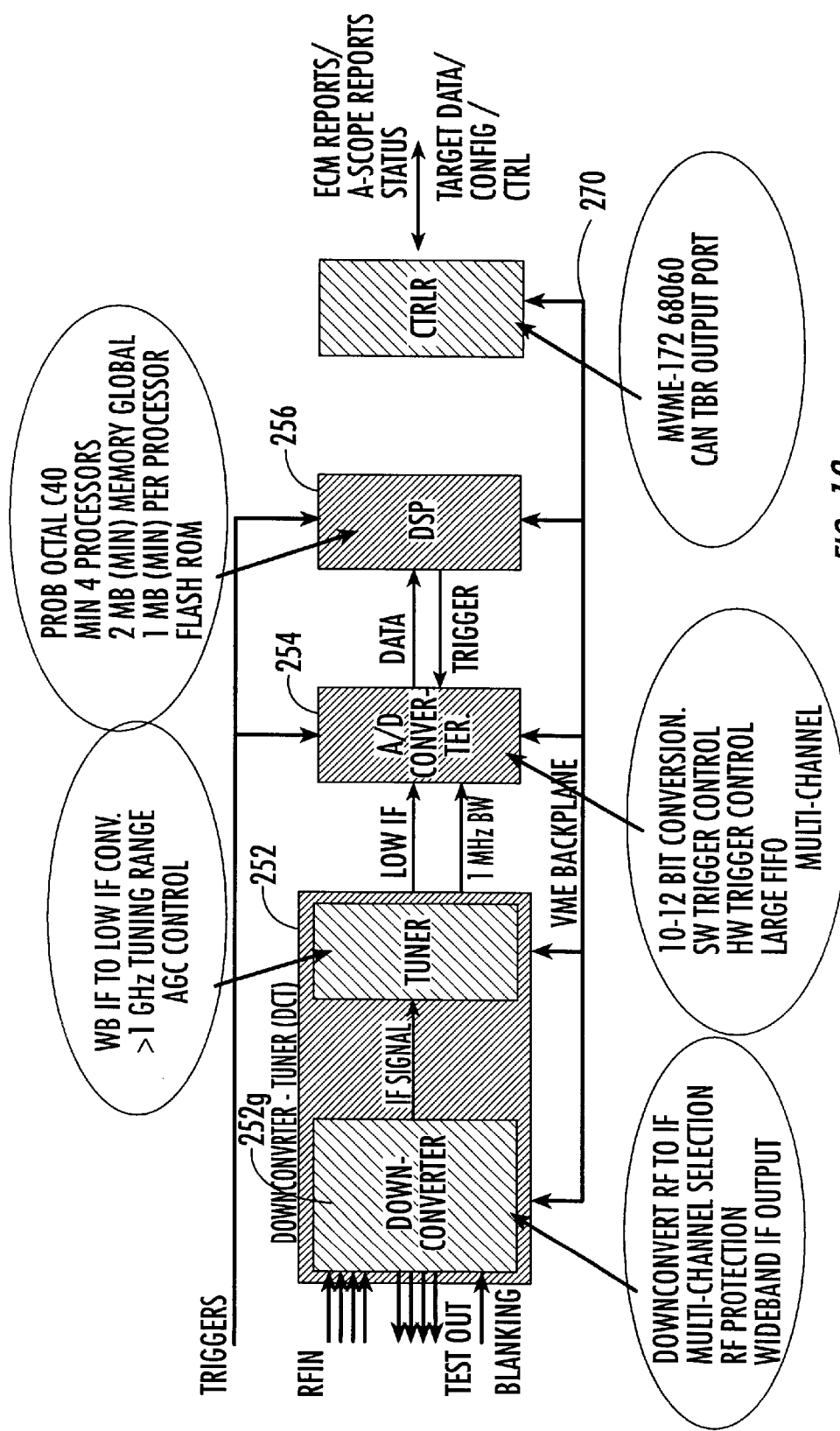
FIG. 13 illustrates another schematic, block diagram of the radar receiver of the present invention showing greater details of the down-converter, tuner, A/D converter and PSD.

FIG. 13 illustrates another block diagram showing the DCT 252, ADC 254 and processor 256, with written descriptions of the various functions. The component sections 252, 254 and 256 are connected to the VME back plane 270.

The DCT (e.g. tuner) 252 could be a set of VME cards. The down converter 252g could be a different "dash" number for different mini-MUTES platforms, where control could be via the VME back plane 270. Although other control methods could be acceptable, these other methods could complicate the DPS control of tuners/RF switches.

Figure 14:
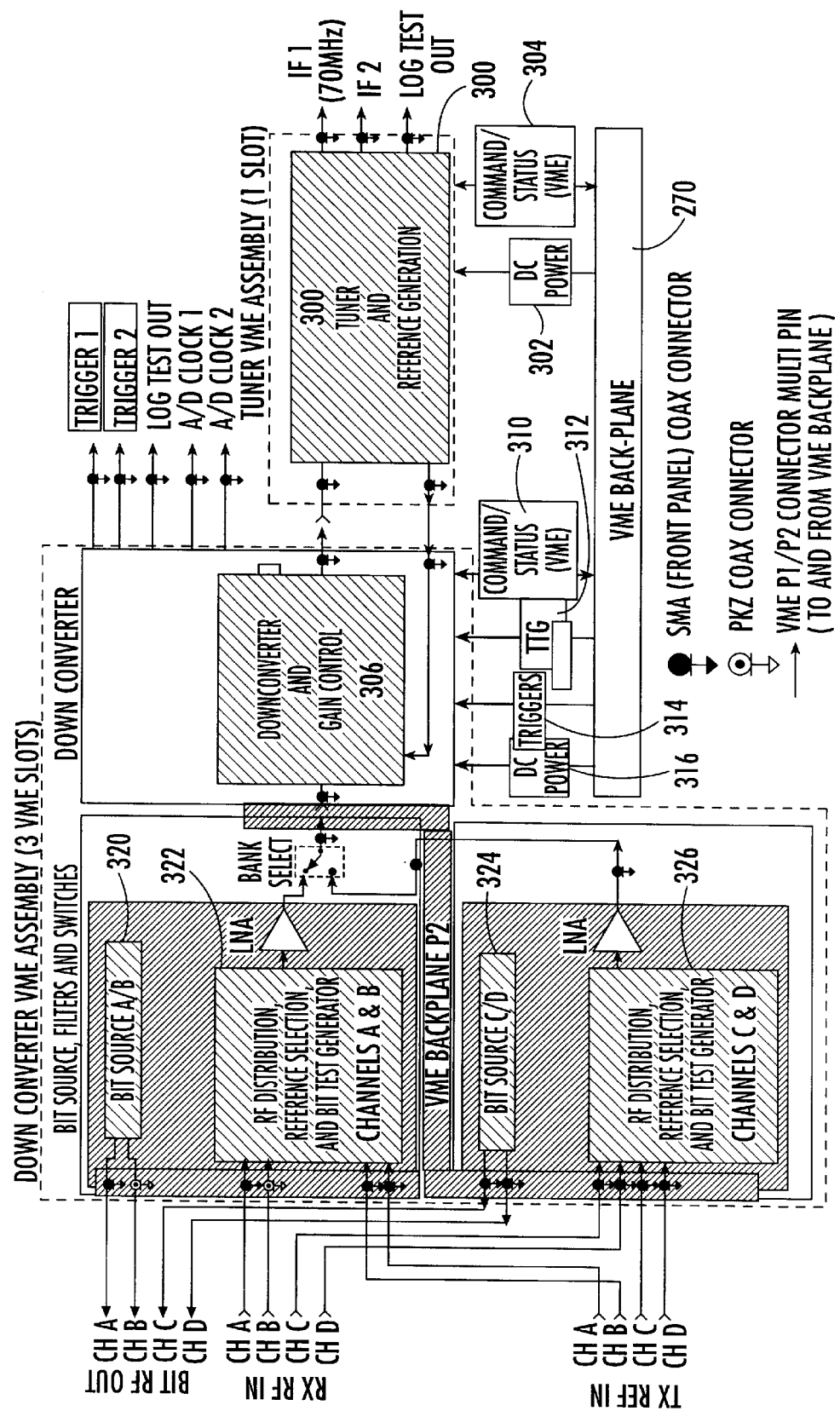
FIG. 14 is another schematic, block diagram of the radar receiver showing greater details of the various components of the radar receiver.

FIG. 14 shows a down converter/tuner functional block diagram with the tuner and reference generation block connected to the VME back plane 270 via DC power circuit 302 and command/status circuit 304 of the VME. The down converter and gain control circuit 306 is also connected to the tuner and reference generation circuit 300 and operatively connected to the VME back plane 270 via a command/status circuit 310, a TTG circuit 312, triggers 314 and DC power circuit 316. The bit source 320 for channels A and B, filters and switches are connected to a RF distribution, reference selection and bit test generation circuit 322 for channels A and B, and a second bit source 324 for channels C and D and RF distribution, reference selection and bit test generator circuit 326.

The DCT uses the same hardware as used for pulse Doppler processing and the Doppler processing is the same as planned in the base line for the CW. The transmitter and down converter/tuner are shown in FIG. 12 with the various components, including an ADC card connected to the COHO demodulator with the demultiplexer and return reference for the various I and Q channels.

Figure 15:
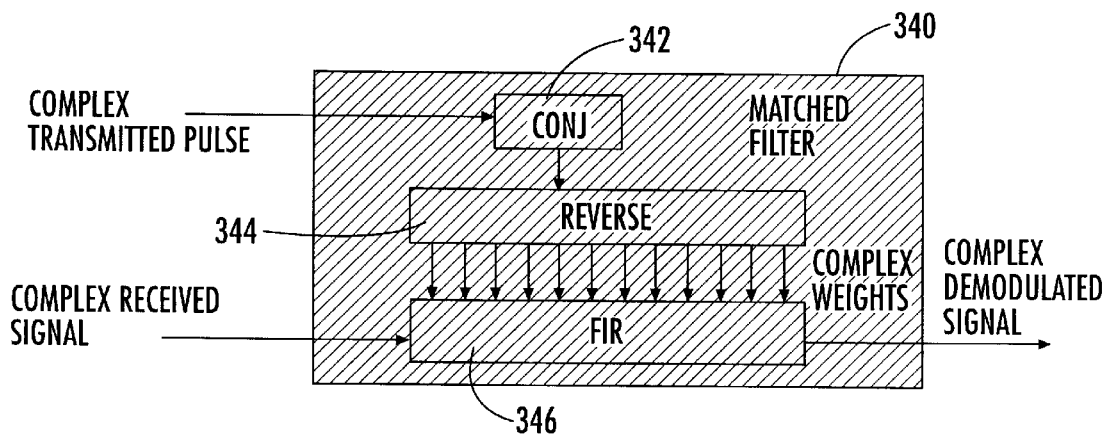
FIG. 15 is a schematic diagram illustrating the processing of the transmitted pulse and complex received signal within the matched filter.

FIG. 15 illustrates greater details of the matched filter process of the present invention. The matched filter 340 includes the conjugate circuit 342 and the reverse circuit 344 working in conjunction with the Finite Impulse Response (FIR) filter 346. The complex transmitted pulse produces the complex weights that work with the complex received signal to produce the complex demodulated signal. It is evident that the received signal is covolved with a sample of the transmitted waveform:

$$Yi = \sum_{j=0}^{j=n} (Rj * Ti - j)$$

The FIR filter with the tap weights is established by the down converted conjugated, time-reverse, transmit reference.

Referring now to FIGS. 16A–F and 17A–E, the RGPO and VGPO technique is illustrated. Pull-off profiles can be provided by the selected design criteria. The RGPO pull-off is quadratic with time as illustrated in FIGS. 16A–F and can be periodic or a periodic (FIGS. 16E and 16F). The VGPO pull-off is linear with time as shown in FIGS. 17A–E and can be periodic or a periodic (FIGS. 17D and 17E).

FIGS. 18A, 18B and 18C show how ECM pulses may not be matched to the transmit pulse where the transmit pulses and skin returns are shown. Pull-off tracker flags are shown in FIGS. 19A, 19B and 19C where the deceptions are illustrated.

A Range Doppler Map is illustrated in FIGS. 20A–D where the analog map at the ECM receiver (FIG. 20A) is shown with the compressed map at the MCG (FIG. 20D). Velocity projection (FIG. 20C) is also shown, as well as range projection (FIG. 20B).

Figure 21A:
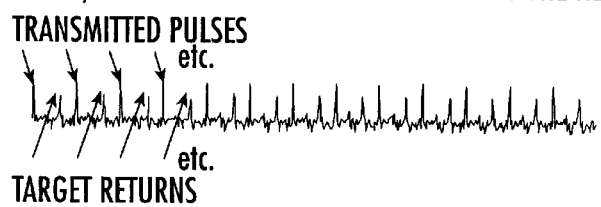
FIGS. 21A and 21B are graphs illustrating the target returns with unambiguous and ambiguous ranges.
Figure 21B:
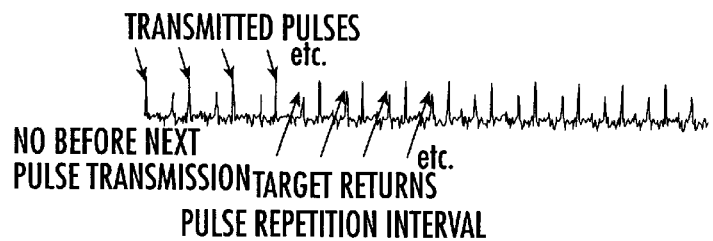

FIGS. 21A and 21B illustrate how at unambiguous ranges, the target or skin returns occur prior to the next transmitted pulse (FIG. 21A), while at ambiguous ranges, the target returns occur following one or more subsequent transmitted pulse (FIG. 21B).

The following data represents various pulse parameters for a "typical" pulse Doppler signal that could be used in accordance with the present invention, as an example only.

| Pulse Width | (PW) | 0.4 to 8.0 $\mu s$ |
|---|---|---|
| Pulse Repetition Frequency | (PRF) | 10 to 110 kHz |
| Pulse Repetition Interval | (RPI) | 100 to 9 $\mu s$ |
| Number of Pulses in Group | | Signal Dependent |
| 500 to 600 | | 40 to 4000 |
| 70 to 150 | | 4000 (continuous) |

The number of pulses in a group determines the size of the Doppler transform. It has been found that 256 point transforms are adequate for use in the present invention. This can be verified with respect to frequency resolution and maximum detectable Doppler. This defines the dimension of the frequency axis of the range-Doppler map. The number of digitized samples between transmission pulses determines the number of FFT's required and defines the dimension of the range axis of the range-Doppler map. As will be explained later, this axis should have approximately 400 bins. This results in a range-Doppler map of dimension 400 (or smaller)×156 (range by frequency).

Figure 22B:
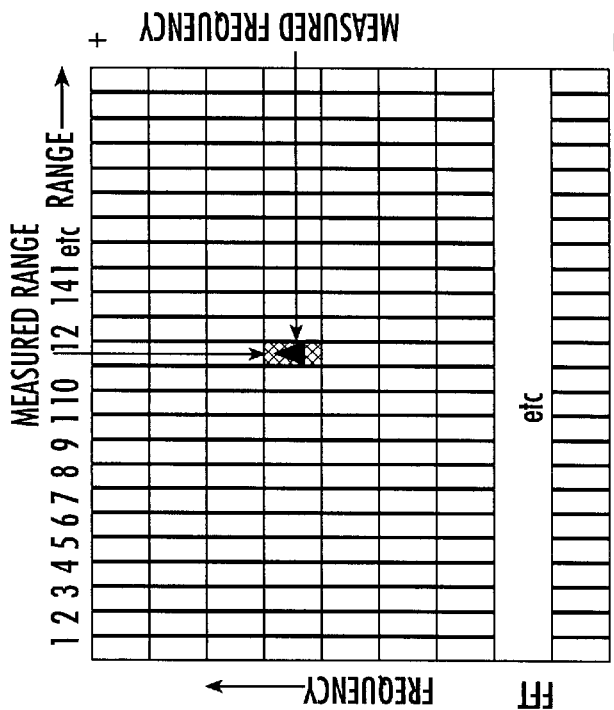
FIGS. 22A and 22B are graphs illustrating the frequency versus the measured range.
Figure 22A:
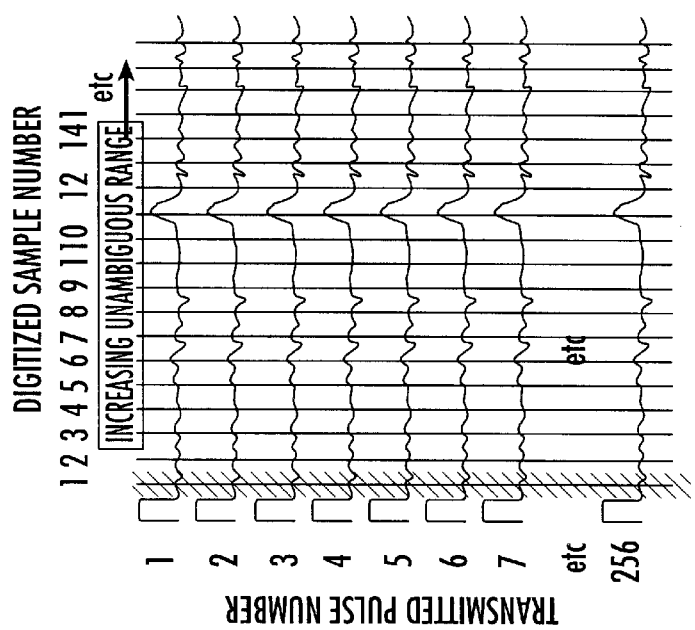

The formation of the range-Doppler map is one important aspect of the present invention to aid in determining range. The transmitted pulses in the pulse group create a return vector corresponding to the range in the rows of the matrix as shown in FIGS. 22A and 22B. Each sample at the same relative distance from the transmitted pulse in these rows is at the same range. Vectors of measurements are formed at the same range by viewing the data in the matrix columns. A Fast Fourier Transform (FFT) process is performed on these constant range samples. This is done at every range, and the number of transforms then equals the number of digitized samples in the unambiguous range.

Figure 23A:
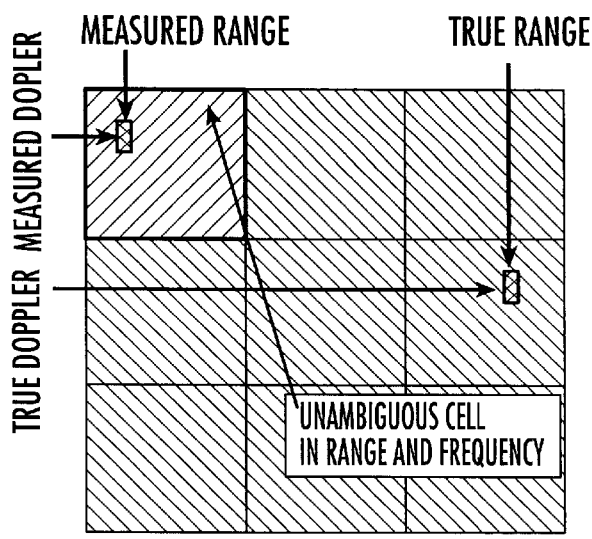
FIGS. 23A and 23B are graphs illustrating the unambiguous cell in range and frequency and the frequency versus the measured range.
Figure 23B:
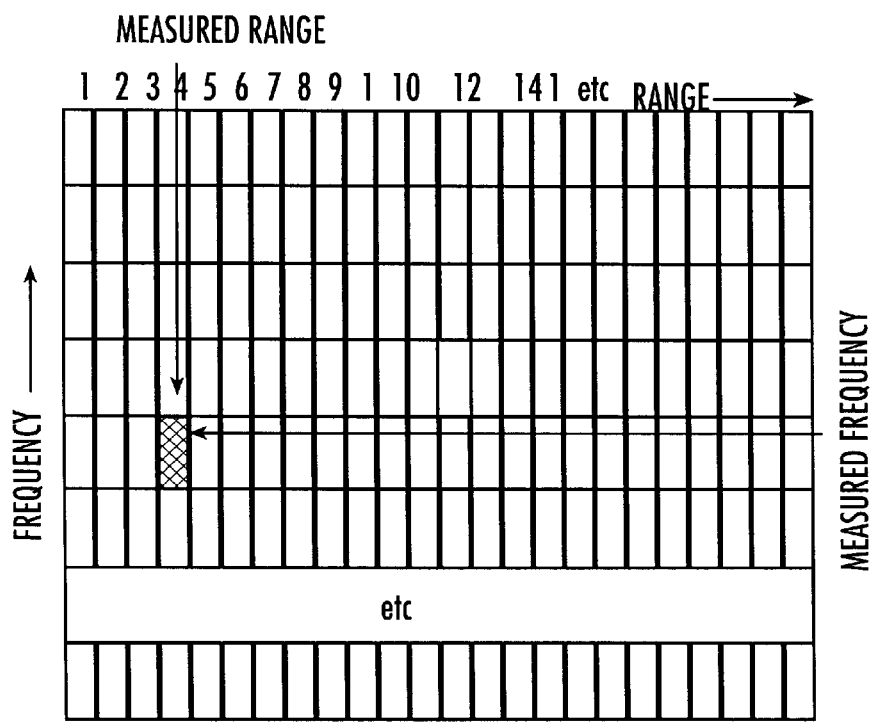

The range or frequency ambiguity also has an affect in accordance with the present invention. Either range or frequency ambiguity has the same affect. It causes the measured range to be less than the true range and bounds it by the maximum range or Doppler that can be resolved: $R_{max}$ or $F_{max}$. For example, $$R = k * R_{max} + R'$$

where R is the true range, k is an integer, $R_{max}$ is the unambiguous range, and R' is the measured range in the range-Doppler map:

$$F = m * F_{max} + F'$$

where F is the true Doppler, and m is an integer. $F_{max}$ is the unambiguous Doppler frequency, and F' is the measured frequency. As shown in FIGS. 23A and 23B, the receiver determines the true range and range rate from the IFF measurements, and reports the unambiguous range and Doppler. Additionally, it can predict the expected location of the skin return by solving the above equations for R' and F'.

In accordance with the present invention, the size of the FFT can be determined for Doppler processing. The Velocity Gate Pull Off (VGPO) requirements are such that the processing spans 64 kHz with a resolution of 1 kHz. The frequency resolution is approximately the reciprocal of the period over which the receiver acquires the data depending on the data window function that is used. The data acquisition interval, $T_{FFT}$, is NP * PRI, where NP is the transform size. PRI ranges from 9 to 100 μs. NP can be found as 1 (PRI * FRES)=PRF/$F_{RES}$.

| For 1 kHz resolution, | |
|---|---|
| at PRI = 1/110 kHz | NP = 110 kHz = 110 points |
| at PRI = 1/10 kHz | NP = 10 kHz = 10 points |

The number of points available for transforming is the number of pulses used in the SOI. When there are less than 256 pulses, the receiver can zero pad the FFT to 256 points. When there are more than 256 pulses, the receiver will still process only 256 points. This permits an estimate of the real time required to perform the Fourier analysis.

As an example, the FFT size can be about 256 points. When less data is available, the system can zero pad to 256 points. The number of points available for the FFT equals the number of pulses in the pulse train and ranges from 70 to 4000. The receiver typically will never process more than 400 transforms as this meets a requirement for maximum range, in one example.

The number of FFTs/maximum unambiguous range can also be determined. The Range Gate Pull Off (RFPO) requirements are such that the processing spans a 160 km range with a resolution of 400 m. The range granularity is tied to the A/D sampling rate and the DDC decimation factor. (Range resolution is inversely proportional to the transmit pulse width.) For a radar path (twice the target range), 400 m corresponds to a time interval of 2.669 μs. To have a data sample at this interval, the data rate should be greater than 1/2669 μs=376 kHz. The receiver satisfies the Nyquist theorem for sampling, however, to produce oversampling to accommodate non-ideal IF filtering, the DDC decimates the data rate to 4 MHz. This data rate produces a range resolution of 37.47 m (122.9 ft), exceeding the requirement.

For pulse-Doppler processing, the receiver cannot control the span or ambiguous range. This is a function of the signal of interest and corresponds to the PRI. For the PRI's associated with SOI's, the unambiguous range is 0.735 nmi (1.363 km)<$R_{max}$<8.089 nmi (14.99 km). Any ranges greater than that associated with the PRI will alias in the range-Doppler map as previously discussed.

The maximum number of FFT's equals the number of A/D samples in the unambiguous range. The number of A/D samples in the unambiguous range is the PRI times the sampling range. Assuming a 4MHz sampling rate,

| at 10 kHz PRF | $N_{FFT}$ = 4 MHZ/10 kHz = 400 |
|---|---|
| at 110 kHz PRF | $N_{FFT}$ = 4 MHZ/110 kHz = 36 |

When the true target range is at an ambiguous range, the receiver will discard k pulses of the return so that the first vector used in the transform will indeed contain target return. The maximum number of pulses dropped can be the maximum required range divided by the unambiguous range. Drop$_{max}$=int[160 km/14.99 km] =10 pulses. This is not a large number and will have no effect on the FFT's when $N_{FFT}$ available is 400. Operation in the ambiguous range with the 110 kHz PRF is not reasonable (the target should be very close when in this mode) so the receiver should not have to drop pulses from the transform.

In one specific example, the final data rate of 4 MHz exceeds the sampling rate required to achieve the required range resolution. The maximum range is dictated by the SOI itself and equals the unambiguous range. For the receiver SOI's, the maximum unambiguous range is 8.089 nmi (14.99 km). The number of FFT's that must be executed ranges from 36 to 400. The system may discard some pulse samples when the target range is ambiguous.

The receiver cannot begin processing the FFT's until all the data has been acquired and demodulated. As an example, with only 40 ms of FFT time required, it is not unreasonable for one CPU to perform all the FFT's. Should this not bear out in fact, multiple CPU's could be used to produce the transforms. The CFAR processing may require multiprocessing. There may be some shortcuts that can preclude computing all the CFAR thresholds. Otherwise, this could be a major computational load.

Complex mode FFT's will permit developing the FFT's for the range-Doppler map in about 40 ms. The demodulation and processing leading to it can be performed on a pulse-by-pulse basis as the system receives data.

The receiver could use two types of memory: flash and execute. Flash memory must be sufficiently large to accommodate all programs (more than just the pulse-Doppler program) plus all constants. Configuration data can be dynamic as it will be supplied via the controller.

Execute memory must be large enough to accommodate all work space including the one large matrix that contains the RD map. This matrix is as large as 400×128 words ×4 bytes/word=409.6 k. The receiver will use a 128 point transform and there are 4 bytes per floating point word. The demodulated data will initially be placed into this matrix. The transformed FFT data will overwrite this data. Although the matrix can be stored in global RAM, it may cost the processing time to do so if multiple processes must get to it at one time. There may also be a penalty for using global memory at all. If so, this matrix memory must be on a per processor basis. Each processor would typically require its own program and execution memory in addition to the above matrix memory.

Flash memory should be sufficient to store up to 10 programs. As an example, the range-Doppler matrix requires storage of 410 kB. Each processor may require storage for this matrix plus its own program plus its work space.

The R-D map can be processed for CFAR detection in columns. This is in the direction of increasing frequency. The receiver can perform the CFAR computation as a digital image filter using the following equation:

Map(i,j-3)=2×(3×3)×Map(i,j)-Σ[m=-1 to +1]Σ[n=-1 to +1]
    Map(i,j) for i=4 to $i_{max}$-1, j=4 to $j_{max}$-1

This results in the processed map being stored over itself with a displacement of three range bins to the left (smaller range). This minimizes matrix storage RAM. All range measurements must be incremented by three times the range resolution of the R-D map. $i_{max}$ and $j_{max}$ are the dimensions of the array.

In the example as explained above, each CFAR filter calculation requires one multiply and nine additions. Recursive approaches can reduce the addition to three subtractions and three additions. The problem with the recursive approach is that round-off could affect accuracy. However, if the map is type INTEGER, and all arithmetic is done in integer modes, there should not be any round-off. There could be nine pointer increments. Following the application of the CFAR filter, the receiver could locate the target return and then search the map for ECM, which must be the one next largest value. Both the target and the ECM filtered product must be greater than a specified threshold to be valid (detected). The detection process also requires $(i_{max}-4) \times (j_{max}-4)$ comparisons to a constant (the threshold).

The radar receiver of the present invention can use a nine-element aperture for CFAR analysis. The FFT size will be adjusted with the number of pulses available for processing to make the R-D map measurement resolution predictable. The receiver will toss the first two range columns and first two frequency rows of the R-D map as they contain blanking/clutter or DC components. The receiver can creatively reuse the matrix region and employ an image processing filter to effect the CFAR computation. For a worst case size of 128 frequency terms and 400 range terms, there are 99.792 cells to process resulting in roughly 100 k multiplies, 1 M additions, 100 k comparisons, and 900 k pointer increments or roughly 2 M operations. With a single processor running with 25 MOPS, this requires roughly 80 ms.

The receiver of the present invention uses I/Q processing, as noted above, and can be designed to process each channel in 0.5 seconds, switching channels, frequencies and configuration, even executables, if necessary, at the 0.5 second boundaries. The maximum permitted latency to switch channels and re-tune is 10 ms, which allows leveraging of the same 10 ms upon DSP for change over.

Maximum data ingest time is equal to the required number of pulses times the PRI plus any dropped pulses due to range ambiguity (max of 10). Worst case ingest time is then $T=0.1ms \times (256+10)=26.6$ ms. However, intelligent use of the trigger information will permit the radar receiver to acquire the data for each pulse as they are received. While receiving additional pulse data, the receiver can begin the demodulation process, performing the down conversion and matched filtering. Multiple processors can be used for the signal processing. For example, a CPU can continue to control the data acquisition process and store data into the RD matrix. It can then "hand out" vectors to idle processors to demodulate. The demodulated data is then stored back into the RD matrix in its original location. In this manner, much of the ingest time is used for the demodulation time.

The FFT transforms typically are not begun until the last pulse has been received and demodulated. Once that is done, one or more processors can proceed to transform the RD matrix. Searching for the target and ECM cannot commence until after the transforms are complete (although a search along the Doppler dimension can commence as soon as 3–5 transforms are done). If multiprocessing is required, regions (e.g., hemispheres, quadrants, etc.) can be assigned to different processors to search for regions of interest with the final decisions made by comparing the signal strengths of the best ECM hits from each processor.

When the receiver detects the presence of ECM (by comparing a region with no signal or ECM to an absolute threshold above the receiver average noise floor), the apparatus can take the PD processing off line while the apparatus tunes the receiver across the ±20 MHz of the transmit center frequency in 1 MHz steps with a 1 MHz IF filter. With a tuner settling time of 10 ms and expected 10 ms of data required for noise power measurements, this will require 20 ms per measurement or 800 ms for the entire characterization. If the tuner settles more quickly, this might be decreased to less than 0.5 seconds.

Figure 24:
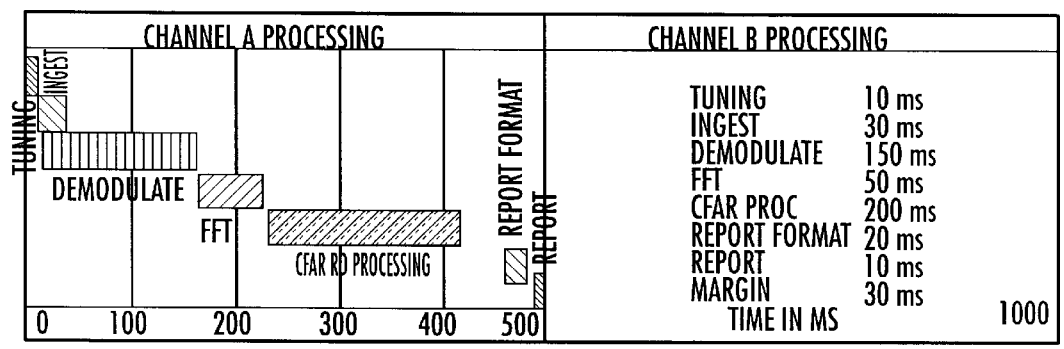
FIG. 24 is a graph illustrating a timing sequence for the demodulation and the fast Fourier transform.

As shown in FIG. 24, the 0.5 second time line for pulse-Doppler processing appears achievable. There are also some AGC/STC considerations in the system. AGC is required to keep both the receiver from saturating when the target/ECM is at close range and keep the A/D converter from saturating. The receiver controls the AGC on a per frame basis from the DSP as it measures signal power. Enough ADC head room is required to accommodate all signal amplitude fluctuations, intended as an AM modulated noise, and unintended as from scintillation as the A/C aspect angle changes, as different reflecting surfaces generate multipath combinations.

Because the receiver is essentially blanked by power protection circuitry for approximately 3 µs following release of the blanking cover pulse, the nearest range that we will ever be able to see is that corresponding to 3 µs. This corresponds to almost 1500 feet (~450 m). Assuming a Mach 1 aircraft, the range can change by 1087 ft in one second. Therefore, the A/C can be at 2500 ft and then be at 1500 ft one second later. (Our proposed AGC update rate is once per second.) The receive power will change by the ratio of the ranges to the fourth power, or in dB, $40 \log(R1/R2) = 40 \log (2500/1500) = 8.87$ dB.

8.87 dB is approximately 1.5 bits of the system A/D converter. Reserving 3 bits for head room at this range will not affect any processing. Therefore, an STC function is not required provided that the system anticipates the increase in signal level by computing the $\Delta R/\Delta t$ (done to estimate Doppler frequencies) and use this value to predict the expected increase/decrease in signal power over the next one second. AGC is still required to accommodate reception of targets at the limits of the receiver range, out to roughly 100 nmi, to near range, approximately 0.25 nmi. These ranges are roughly a ratio 400 corresponding to a dynamic range of over 104 dB ($40 \log[100/0.25]$).

An AGC function is required to accommodate the expected signal power variation from 0.5 to 100 nmi. STC is not required if the AGC gain anticipates the change in target range. The AGC should settle in the same 10 ms allocated for synthesizer stabilization. AGC is implemented as a MGC on a per pulse frame basis.

Figure 25:
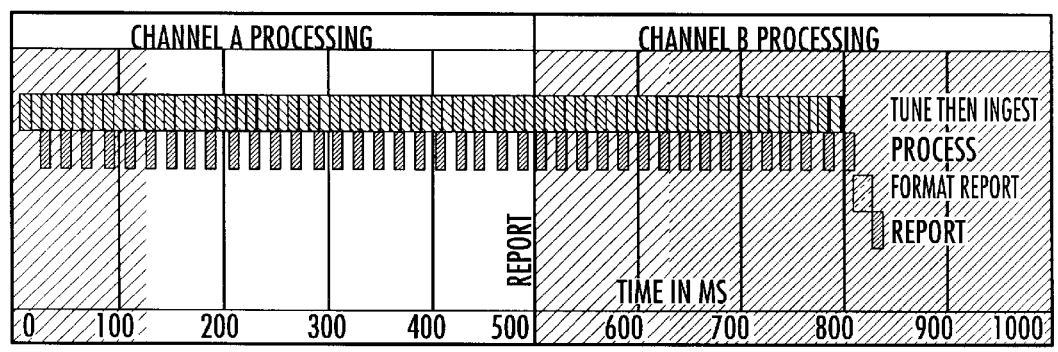
FIG. 25 is a graph illustrating another time and sequence similar to FIG. 24.

As shown in FIG. 25, the CW characterization requires 840 ms. With a faster settling tuner, this could be achieved in under 0.5 second. Processing can be performed in parallel with the tune and ingest process. There is at least a 160 ms margin in a one second frame with the current approach.

Figure 26:
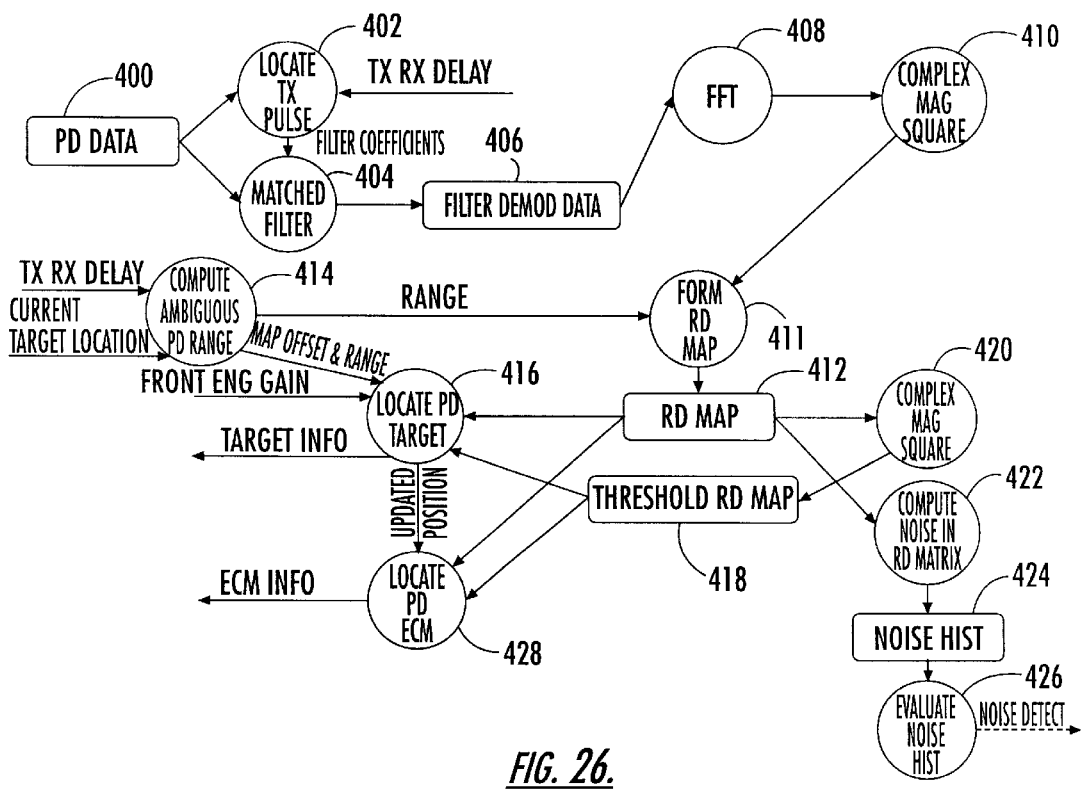
FIG. 26 illustrates the basic flow of the pulse Doppler processing.
Figure 27:
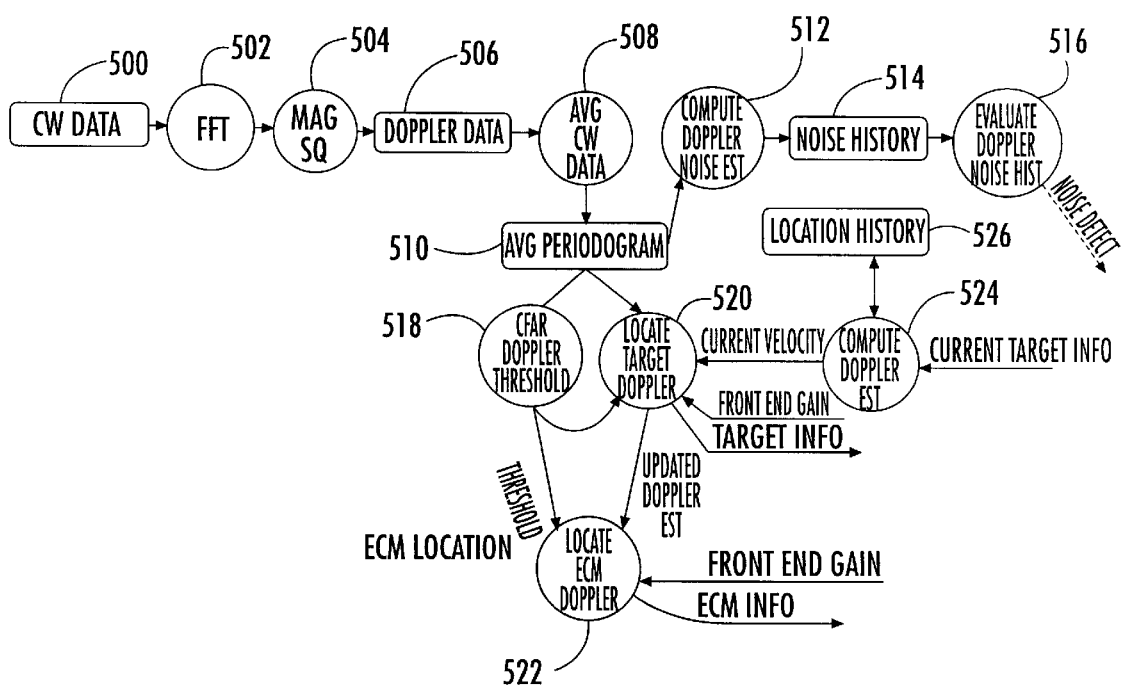
FIG. 27 illustrates a basic flow of the CW processing.

Referring now to FIGS. 26 and 27, two flow charts illustrate the pulse Doppler, pulse and CW processing used in the present invention for the three modes.

As shown in FIG. 26, pulse Doppler data 400 is used with the transmitter receiver delay to locate the transmitter pulse 402 and establish the filter coefficients for the matched filter 404. This information is then used for the filter demodulation of data 406 and then subject to the Fast Fourier Transform 408 into the "Complex Mag Square" 410 to form the RD Map 412. The Transmit Receiver Delay and Current Target Location are used to compute the Ambiguous Pulse Doppler Range 414 that is also used to Form 411 the RD Map 412. The Map Offset and Range is used with the Front Eng Gain to locate the pulse Doppler target 416, which is used to determine the target information. This location of the pulse Doppler target is also determined from the RD Map and the threshold RD Map 418, also formed from the Complex Mag Square 420. Noise can also be computed in the RD matrix 422 to determine a Noise History 424 and evaluate a Noise Histogram 426. The threshold RD Map 418, RD Map 412 and the location of the pulse Doppler target 416 are used to update the position and locate the pulse Doppler ECM 428.

FIG. 27 shows the CW flowchart where the CW Data 500 is processed by the Fast Fourier Transform 502, followed by the Mag Square 504 and the Doppler Data 506 and the Averaged CW Data 508. The Average Periodogram 510 is established and used with the Compute Doppler Noise Estimation 512 to determine Noise History 514 and then evaluated 516. The Average Periodogram 510 is used to determine the CFAR Doppler Threshold 518 and Locate the Target Doppler 520, which in turn, is used to locate the ECM Doppler 522, Estimate 524 and Location History 526 are also determined.

Figure 28:
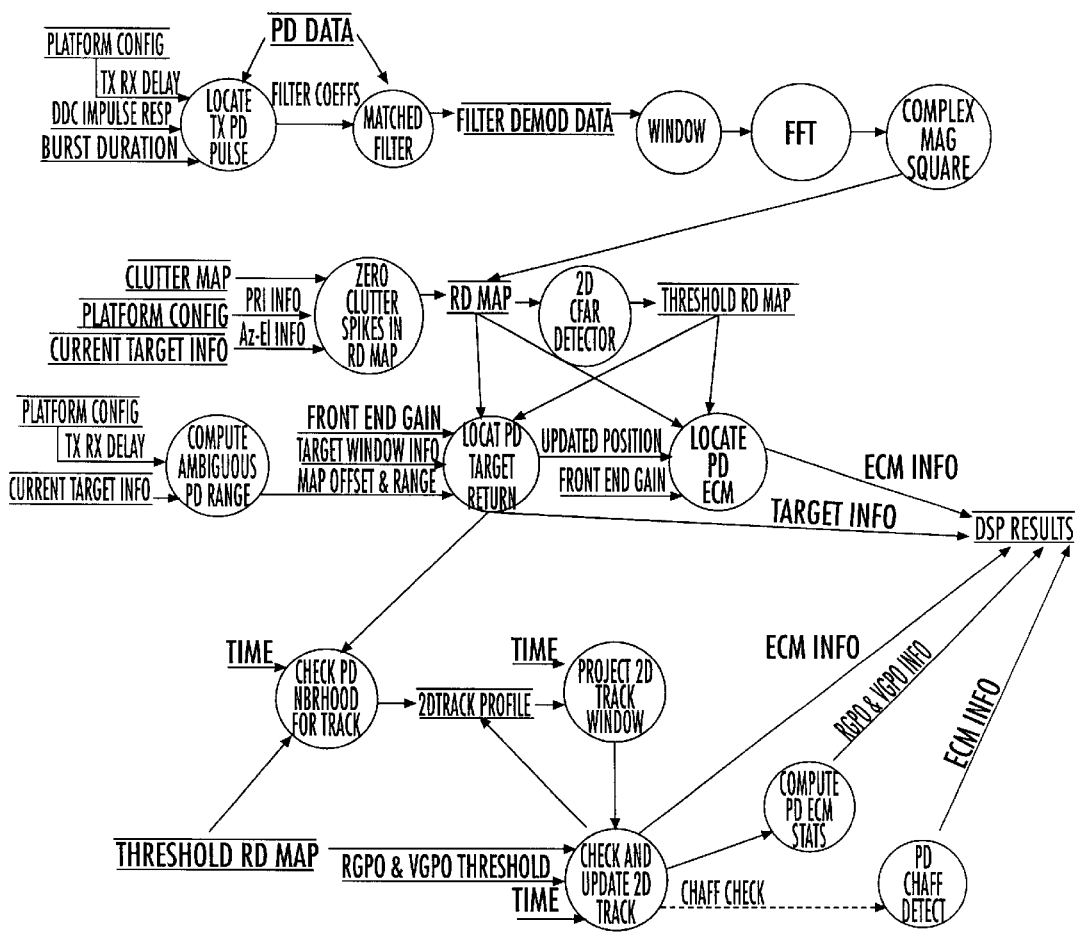
FIGS. 28 and 29 illustrates basic flow of the DSP processing of the pulse Doppler and CW.
Figure 29:
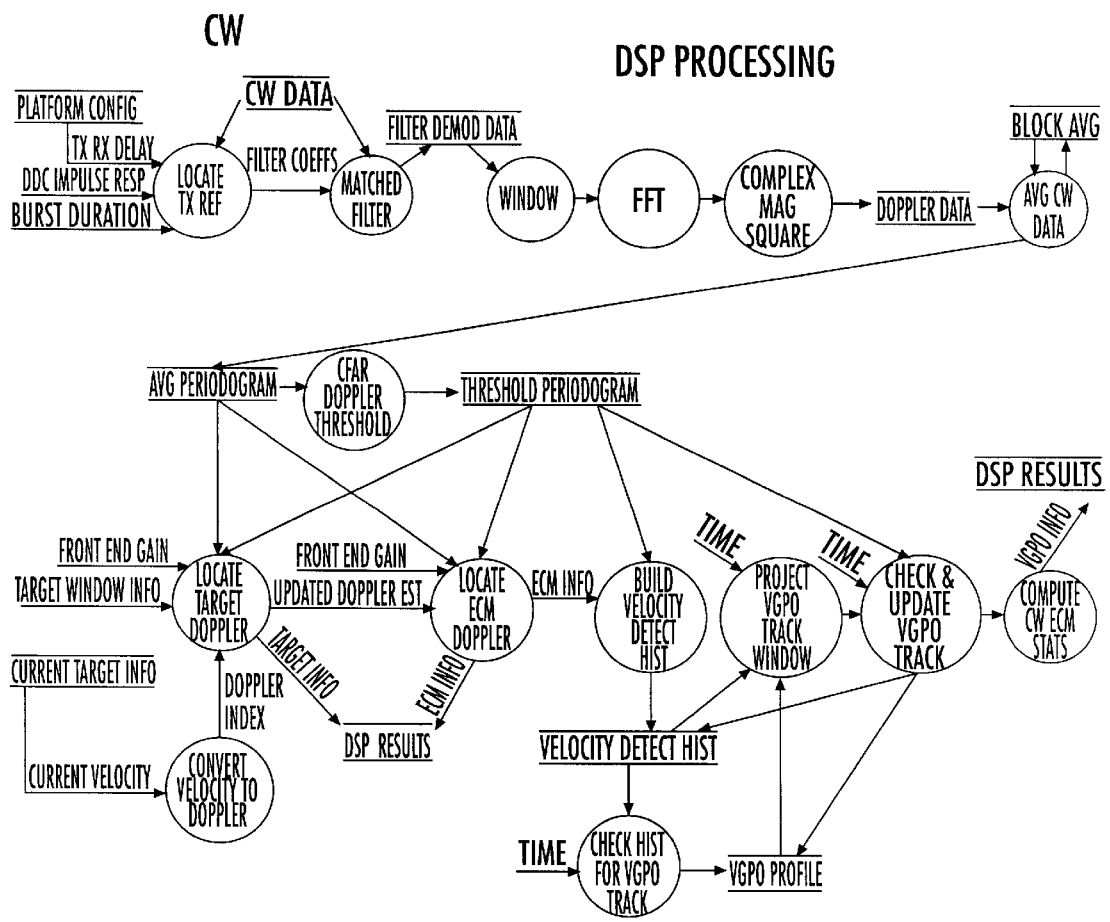

FIGS. 28 and 29 show examples of the digital signal processing (DSP) flow for the respective Pulse Doppler and CW modes.

Figure 30:
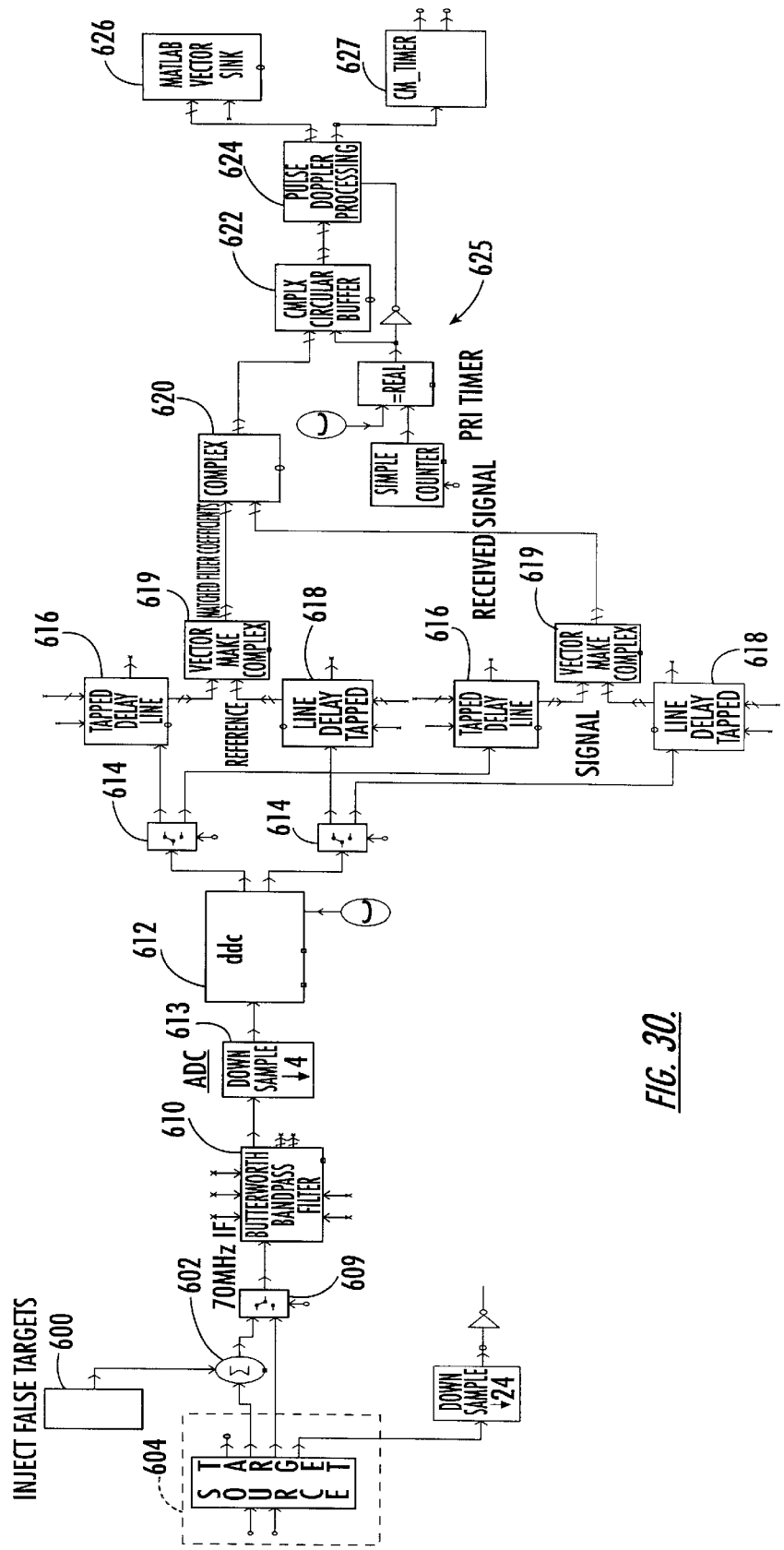
FIGS. 30–34 illustrate an SPW model for testing of the pulse-Doppler and CW.
Figure 31:
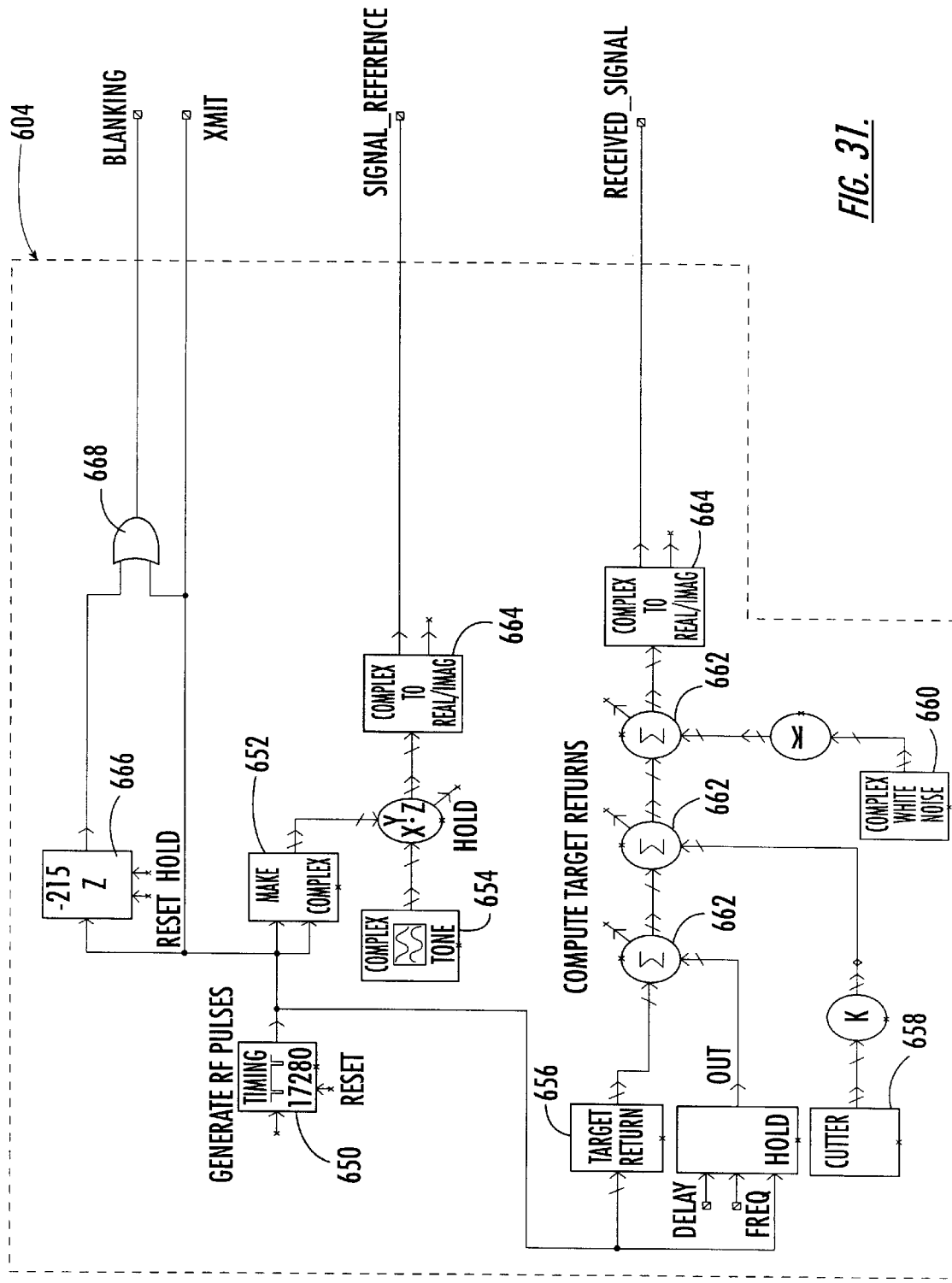

FIGS. 30 and 31 illustrate a pulse-Doppler processing SPW simulation. The model simulated a pulse-Doppler radar that used the digital drop converter (DDC) to decimate and move the signal down the baseband.

A circuit 600 was used to inject false targets to a summation circuit 602, where the source parameters and target parameters are used via circuit 604 to generate the blanking (to down sample 604a), transmit, signal reference and receive signals as outputs (shown in greater detail in FIG. 31). A switch 609 and Butterworth bandpass filter 610 receives the 70 MHz IF and forwards signals into the DDC 612 after down sampling 613. The I and Q signal outputs connect into the respective blanking switches 614 and tapped delay line and line delay tap circuits 616, 618. The received signal and matched filter coefficients are processed through "vector make complex" 619 and via a complex correlation 620 as a dot product, followed by the complex circular buffer 622 and pulse-Doppler processing 624, controlled by simple counter circuit 625. A vector sink 626 and timer 627 receive the signals.

Typical parameters include:

| SOURCE PARAMETERS | | TARGET PARAMETERS | |
|---|---|---|---|
| Sampling Frequency | 10e6 | Target 1 delay (sec) | 1.5e-5 |
| | 5.3e-6 | Target 1 gain (dB) | 0.0 |
| | 13888.889 | Target 1 velocity (m/s) | −40.0 |
| RF sample rate | 240000000.0 | Frame Time | 0.2 |
| Number of columns (range gates) | 658.0 | | |
| | | RF Frequency (GHZ) | 10.0 |
| Estimated width of pulse response | 62.0 | Gain of RGPO/VGPO signal (dB) | 10.0 |
| | | Clutter-to-Noise ratio (CNR) (dB) | 10.0 |
| PROCESSING PARAMETERS | | DDC PARAMETERS | |
| Number of rows (Doppler bins) | 64 | CIC2 Decimation Factor | 2 |
| Starting sample | 1 | CIC5 Decimation Factor | 3 |
| Ending sample | 719 | RCF Decimation Factor | 1 |
| CFAR threshold type | 'CA' | | |
| CFAR threshold multiplier | 10.0 | | |
| | | ECM PARAMETERS | |
| CFAR vertical window size | 5 | | |
| CFAR horizontal window size | 5 | RGPO/VGPO Pull Length (sec) | 2.0 |
| CFAR vertical | 1 | RGPO rate in | 2.5 |

| -continued | | | |
|---|---|---|---|
| guard cells | | usec/sec2 | |
| CFAR horizontal guard cells | 1 | VGPO rate in KHz/sec | 32.0 |

FIG. 31 illustrates the circuit 604 and timing circuit 650, the make complex 652 and complex tone circuits 654, the target return 656 and clutter circuits 658, the complex white noise circuit 660, the summation circuits 662, the complex to real/imaging circuits 664, the Z circuits 666, and the logic OR gate 668. The blanking, transmit, signal reference and receive signal outputs are output.

Figure 32:
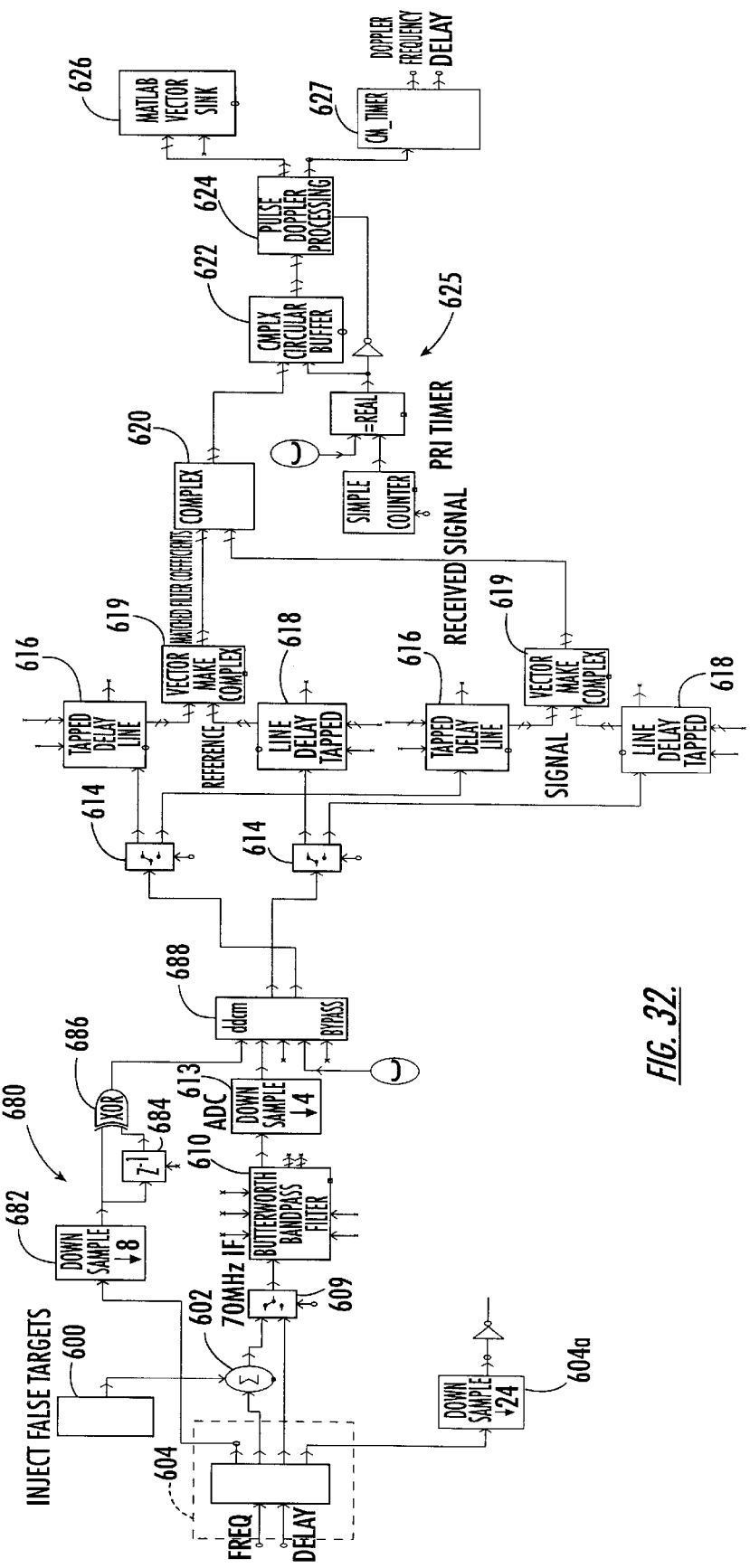

FIG. 32 illustrates an SPW that simulates a pseudo-pulse continuous wave radar system and is a variation of a model shown in FIG. 30. The reference numerals corresponding to similar elements are set forth except for the logic circuit 680 that includes the down sample circuit 682, the Z circuit 684, the exclusive OR gate 686, and the DDM 688. It is evident that the SPW of FIG. 32 includes the logic circuit 680 that provides a separate pulse.

Parameters for the pseudo-pulse continuous wave radar as shown in FIG. 32 are set forth below.

| SOURCE PARAMETERS | | TARGET PARAMETERS | |
|---|---|---|---|
| Sampling Frequency (Hz) | 10e6 | Target 1 delay (sec) | 5.0e-9 |
| | 2.6e-6 | Target 1 gain (dB) | 0.0 |
| | 128205.1282 | Target 1 velocity (m/s) | −80.0 |
| RF sample rate | 240000000.0 | Frame Time | 0.2 |
| Number of columns (range gates) | 52.0 | | |
| | | RF Frequency (GHz) | 10.0 |
| Estimated width of pulse response | 26.0 | Gain of RGPO/VGPO signal (dB) | 3.0 |
| | | Clutter-to-Noise ratio (CNR) (dB) | 120.0 |
| PROCESSING PARAMETERS | | DDC PARAMETERS | |
| Number of rows (Doppler bins) | 512 | CIC2 Decimation Factor | 2 |
| Starting sample | 1 | CIC5 Decimation Factor | 3 |
| Ending sample | 78 | RCF Decimation Factor | 1 |
| CFAR threshold type | 'CA' | | |
| CFAR threshold multiplier | 10.0 | | |
| | | ECM PARAMETERS | |
| CFAR vertical window size | 5 | | |
| CFAR horizontal window size | 5 | RGPO/VGPO Pull Length (sec) | 2.0 |
| CFAR vertical guard cells | 1 | RGPO rate in usec/sec2 | 0.0 |
| CFAR horizontal guard cells | 1 | VGPO rate in KHz/sec | −8.0 |

The SPW™ model shown in FIG. 32 was used to compensate for the pulse delay in spreading through the signal path. For application in the CW mode, the same processing chain is used as illustrated. The primary difference is with the internal timing generator because there is no blanking pulse available because a transmitter is always transmitting. Other changes include a resulting range Doppler map, which is a range-time map and can be detected and integrated over time with no loss of information.

The sample rate used to represent the RF (70 MHz) signals in the SPW™simulation is arbitrary as long as it satisfies the Nyquist criteria. The actual value is chosen to be an integer multiple of the receiver sampling rate so that an integer down sampling can be used to represent the receiver A/D converter. This minimizes the range drift of the signals and obviates the need for interpolation. This is a subtlety of the process and does not reflect the actual process because the actual receiver processes an analog signal at 70 MHz.

Figure 33:
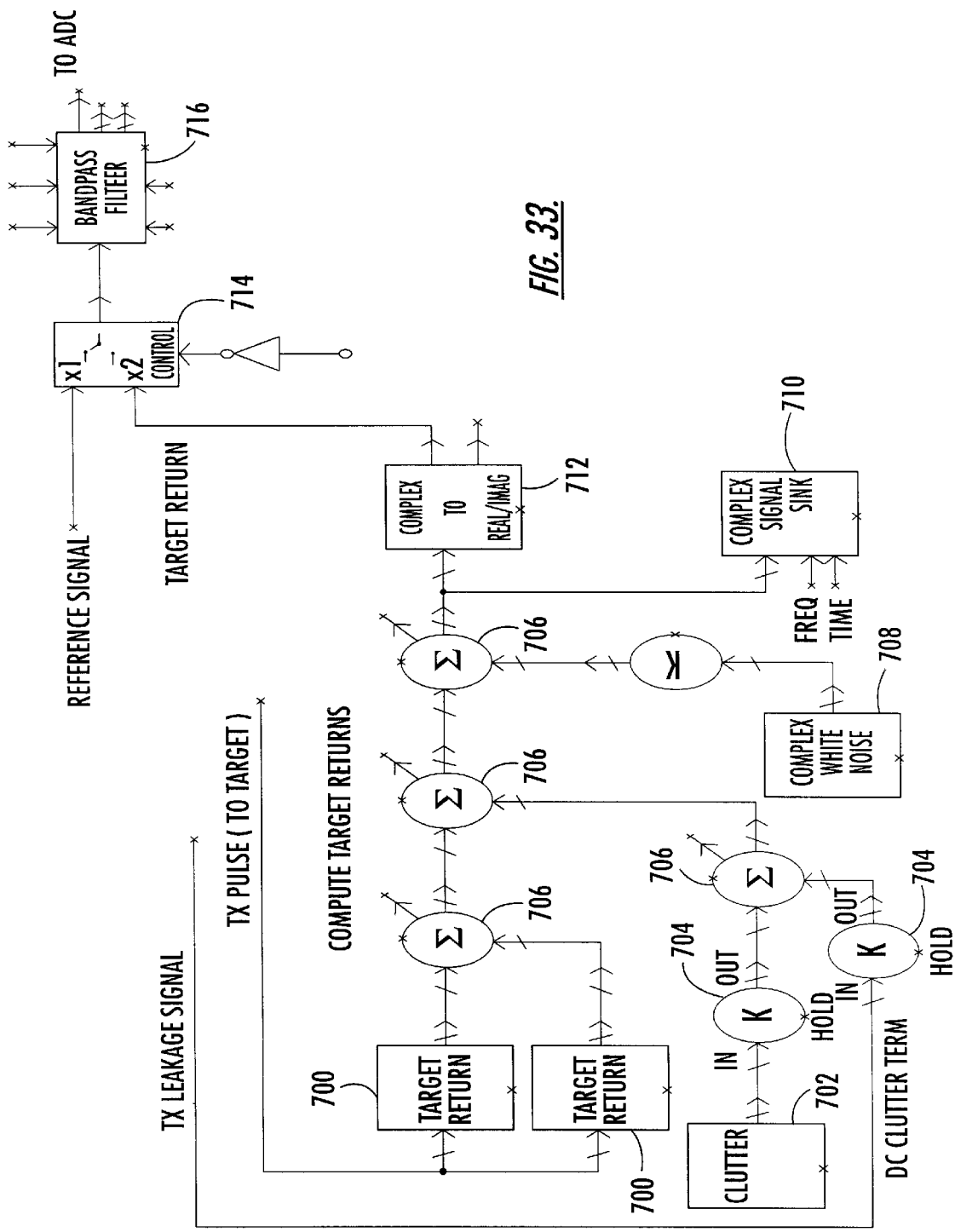

FIG. 33 shows the portion of the simulation that generates the target returns and adds thermal (white) noise and clutter to the return. The target return circuits 700, clutter circuit 702, K circuits 704, summation circuits 706, complex white noise circuit 708, complex signal sink circuit 710, complex to real/imaging circuit 712, switch 714 and bandpass filter 716 are illustrated.

Figure 34:
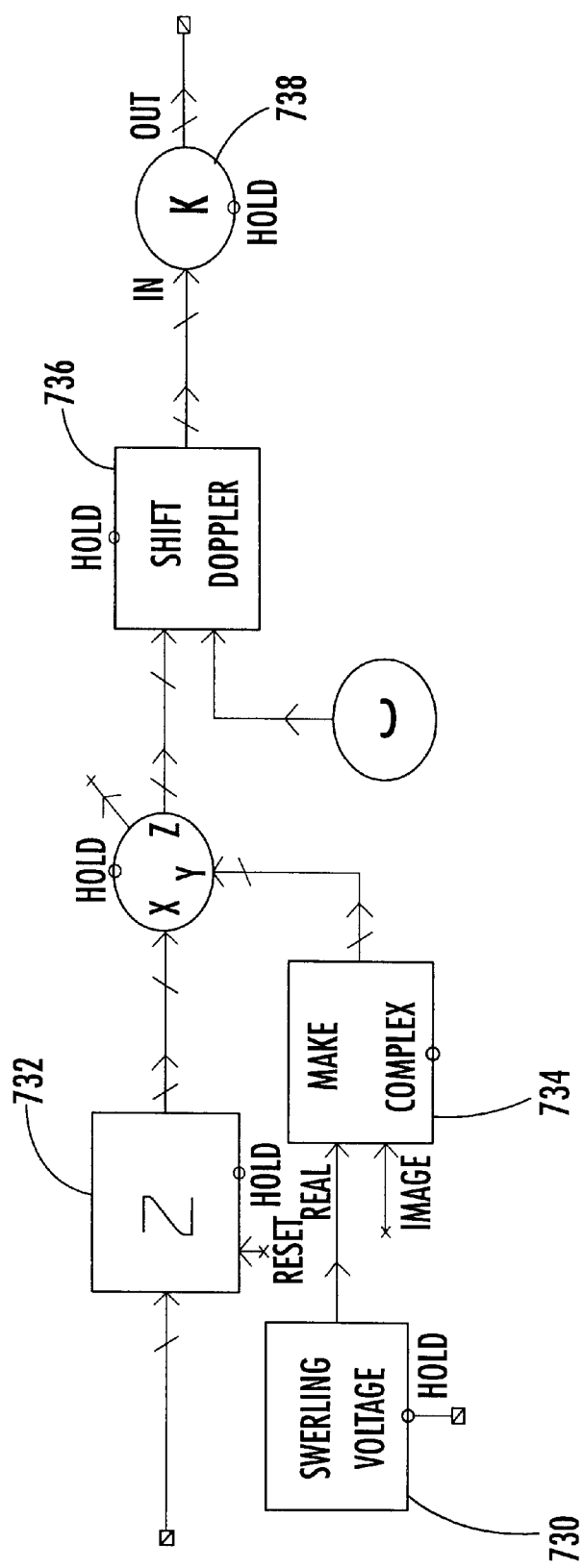

FIG. 34 illustrates the internal details of an actual target return model that shows how the time delay (range), Doppler shift (velocity) and glint variation (using a Swerling case II model) are incorporated into the target signature. If the Doppler is incorporated into the carrier frequency before the sinusoid was generated, then a real sinusoid would be an appropriate model for the process. Because a Doppler shift is incorporated via multiplication, a complex sinusoid must be used to model the process so that the sense of the Doppler shift is preserved. If the same multiply shown is performed on a real signal, the resulting spectrum of the signal is symmetrical because the signals are discrete, and thus, the direction of the Doppler shift would be lost. After the generation of the target return signal is complete, the real part of the result is used to represent the actual signal at the analog-to-digital (A/D) converter view.

FIG. 34 illustrates the Swerling voltage circuit 730, Z circuit 732, make complex circuit 734, shift Doppler circuit 736 and K circuit 738.

Target return block parameters are set forth below.

| TARGET RETURN BLOCK PARAMETERS | |
|---|---|
| MAIN PARAMETERS: | |
| Sampling Frequency (Hz) | 2.0e6 |
| Pulse Repetition Frequency (Hz) | 1000.0 |
| Time delay for target (sec.) | 1.5e-4 |
| Gain for target (dB) | −3.0 |
| Velocity of Target (m/s) | 7.5 |
| RF frequency (GHz) | 10.0 |
| MISCELLANEOUS PARAMETERS: | |
| Initial value | 0.0 |
| Overflow value | 0.0 |
| Error count before action | 1 |
| Action taken (stop or continue) | 'stop' |

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method for operating a radar device comprising the steps of:

sampling a transmitted pulsed-Doppler radar signal as a reference signal based on the transmitted pulse timing to determine quadrature, coherent matched filter coefficients;

receiving a return signal within a radar receiver of the radar device;

processing the return signal as a first intermediate frequency via a mixer and local oscillator, and a second quadrature intermediate frequency via a digital local oscillator and mixer;

processing within a matched filter of the radar receiver both the return and reference signals as quadrature signal components and matched filter coefficients; and performing a Fast Fourier Transform to determine Doppler information.

2. A method according to claim 1, and further comprising the step of blanking the receiver for sampling the transmitted signal for use as a reference for detection.

3. A method according to claim 2, and further comprising the steps of switching between sampling a transmit signal and listening for a received signal.

4. A method according to claim 3, and further comprising the steps of switching back to listen for the signal after the blanking pulse.

5. A method according to claim 1, and further comprising the step of processing the first intermediate frequency within an analog-to-digital converter.

6. A method according to claim 1, and further comprising the step of performing a Fast Fourier Transform down the columns of time domain data to obtain frequency information.

7. A method according to claim 1, and further comprising the step of processing the coherent, matched filter coefficients as taps within a Finite Impulse Response filter, which convolves the signals to provide coherent demodulation of the signal return to zero Hertz baseband with only the residual Doppler frequency present.

8. A method for operating a radar device comprising the steps of:

sampling a continuous wave radar signal by arbitrary but evenly spaced in time pulses generated from a pulse generator source that is internal to the radar receiver to determine quadrature, coherent matched filter coefficients;

receiving a return signal within a radar receiver of the radar device;

processing the return signal as a first intermediate frequency via a mixer and local oscillator, and a second quadrature intermediate frequency via a digital local oscillator and mixer;

processing within a matched filter of the radar receiver both the return and reference signals as quadrature signal components and matched filter coefficients; and performing a Fast Fourier Transform to determine Doppler information.

9. A method according to claim 8, and further comprising the step of processing the first intermediate frequency within an analog-to-digital converter.

10. A method according to claim 8, and further comprising the step of performing a Fast Fourier Transform down the columns of time domain data to obtain frequency information.

11. A method according to claim 8, and further comprising the step of processing the coherent, matched filter coefficients as taps within a Finite Impulse Response filter, which convolves the signals to provide coherent demodulation of the signal return to zero Hertz baseband with only the residual Doppler frequency present.

12. A method according to claim 8, and further comprising the steps of switching between sampling and receiving the received signal.

13. A radar receiver comprising:

a sampling circuit for sampling a transmitted pulsed-Doppler radar signal to determine quadrature, coherent matched filter coefficients based on the transmitted pulse timing;

a first mixer and local oscillator for processing a return signal as a first intermediate frequency;

a digital drop receiver circuit having a second mixer and local oscillator for producing a second intermediate frequency signal as a quadrature signal;

a matched filter for receiving the second intermediate frequency signal and the coherent matched filter coefficients to convolve the signals and provide coherent demodulation; and a Fast Fourier Transform circuit for processing the matched filter output signal to determine Doppler information.

14. A radar receiver according to claim 13, wherein said matched filter comprises a Finite Impulse Response filter that convolves signals to provide coherent demodulation of the signal return to zero Hertz baseband with only the residual Doppler frequency present.

15. A radar receiver according to claim 13, and further comprising a circuit for blanking the receiver during a transmission period for sampling the transmitted signal for use as a reference for detection.

16. A radar receiver according to claim 15, and further comprising a switch for switching between the sampling of the transmit signal and listening for the received signal.

17. A radar receiver according to claim 16, and further comprising an analog-to-digital converter for processing the first intermediate frequency.

18. A radar receiver according to claim 13, wherein said Fast Fourier Transform circuit performs a Fast Fourier Transform down columns for time domain data to obtain frequency information.

19. A radar receiver comprising:

a sampling circuit for sampling a transmitted continuous wave radar signal to determine quadrature, coherent matched filter coefficients based on arbitrary but evenly spaced in time pulses generated from a pulse generator source that is internal to the radar receiver;

a first mixer and local oscillator for processing a return signal as a first intermediate frequency;

a digital drop receiver circuit having a second mixer and local oscillator for producing a second intermediate frequency signal as a quadrature signal;

a matched filter for receiving the second intermediate frequency signal and the coherent matched filter coefficients to convolve the signals and provide coherent demodulation; and a Fast Fourier Transform circuit for processing the matched filter output signal to determine Doppler information.

20. A radar apparatus according to claim 19, wherein said matched filter comprises a Finite Impulse Response filter that convolves signals to provide coherent demodulation of the signal return to zero Hertz baseband with only the residual Doppler frequency present.

21. A radar apparatus according to claim 19, and further comprising a switch for switching between sampling a transmit signal and listening for the received signal.

22. A radar apparatus according to claim 19, and further comprising an analog-to-digital converter for processing the first intermediate frequency.

23. A radar apparatus according to claim 19, wherein said Fast Fourier Transform circuit performs a Fast Fourier Transform down columns for time domain data to obtain frequency information.

* * * * *